(12) United States Patent
Ikegami et al.

(10) Patent No.: US 12,468,118 B2
(45) Date of Patent: Nov. 11, 2025

(54) IMAGING OPTICAL SYSTEM, IMAGE CAPTURE DEVICE, AND CAMERA SYSTEM

(71) Applicant: Panasonic Intellectual Property Management Co., Ltd., Osaka (JP)

(72) Inventors: Yuka Ikegami, Hyogo (JP); Takahiro Kitada, Osaka (JP); Kunio Dohno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 380 days.

(21) Appl. No.: 18/142,264

(22) Filed: May 2, 2023

(65) Prior Publication Data

US 2023/0367186 A1  Nov. 16, 2023

(30) Foreign Application Priority Data

May 16, 2022 (JP) ................................ 2022-080128

(51) Int. Cl.
| | |
|---|---|
| *G02B 9/14* | (2006.01) |
| *G02B 7/02* | (2021.01) |
| *G02B 9/16* | (2006.01) |
| *G03B 17/14* | (2021.01) |
| *H04N 23/12* | (2023.01) |
| *H04N 23/60* | (2023.01) |

(52) U.S. Cl.
CPC .............. *G02B 9/14* (2013.01); *G02B 7/021* (2013.01); *G02B 9/16* (2013.01); *G03B 17/14* (2013.01); *H04N 23/12* (2023.01); *H04N 23/64* (2023.01)

(58) Field of Classification Search
None
See application file for complete search history.

(56) References Cited

U.S. PATENT DOCUMENTS

| | | | | |
|---|---|---|---|---|
| 10,663,705 | B2 * | 5/2020 | Ichikawa | G02B 13/16 |
| 2014/0347749 | A1 * | 11/2014 | Ono | G02B 13/00 |
| | | | | 359/754 |
| 2021/0048652 | A1 * | 2/2021 | Suzuki | G02B 9/64 |
| 2023/0152556 | A1 * | 5/2023 | Ohtake | G02B 9/64 |
| | | | | 359/784 |

FOREIGN PATENT DOCUMENTS

JP  2018-189733  11/2018

* cited by examiner

*Primary Examiner* — Darryl J Collins
(74) *Attorney, Agent, or Firm* — Wenderoth, Lind & Ponack, L.L.P.

(57) ABSTRACT

An imaging optical system consists of: a first lens group having positive power; a second lens group having negative power; and a third lens group having positive power. The first lens group and the third lens group are fixed with respect to an image plane, with the second lens group moving along an optical axis, while the imaging optical system is focusing to make a transition from an infinity in-focus state toward a close-object in-focus state. The first lens group consists of: a sub-lens group G1A; an aperture stop; and a sub-lens group G1B. The sub-lens group G1A includes: a lens L1A1 having negative power; a lens L1A2 having negative power; and a lens L1A3 having negative power.

20 Claims, 10 Drawing Sheets

IMAGING OPTICAL SYSTEM, IMAGE CAPTURE DEVICE, AND CAMERA SYSTEM

CROSS-REFERENCE TO RELATED APPLICATIONS

The present application is based upon, and claims the benefit of priority to, Japanese Patent Application No. 2022-080128, filed on May 16, 2022, the entire contents of which are hereby incorporated by reference.

TECHNICAL FIELD

The present disclosure generally relates to an imaging optical system, an image capture device, and a camera system. More particularly, the present disclosure relates to an imaging optical system with the ability to compensate for various types of aberrations sufficiently, and also relates to an image capture device and camera system, each including such an imaging optical system.

BACKGROUND ART

JP 2018-189733 A discloses a wide-angle lens system including a first lens group G1 having negative refractive power and a following lens group GR including one or more lens groups and having overall positive refractive power. The first lens group G1 and the following lens group GR are arranged in this order such that the first lens group G1 is located closer to the object than the following lens group GR is. In the wide-angle lens system, the air gap between the first lens group G1 and the following lens group GR changes during zooming or focusing. The first lens group G1 includes a lens having a first aspheric surface and a lens having a second aspheric surface and disposed closer to the image plane than the lens having the first aspheric surface is. The first lens group G1 further includes a lens having negative refractive power and located closer to the object than the lens having the second aspheric surface is. The first lens group G1 further includes a lens having positive refractive power and satisfies a predetermined conditional expression.

SUMMARY

The present disclosure provides an imaging optical system with the ability to compensate for various types of aberrations sufficiently, and an image capture device and camera system each including such an imaging optical system.

An imaging optical system according to an aspect of the present disclosure consists of: a first lens group having positive power; a second lens group having negative power; and a third lens group having positive power. The first lens group, the second lens group, and the third lens group are arranged in this order such that the first lens group is located closer to an object than any other lens group of the imaging optical system is.

The first lens group and the third lens group are fixed with respect to an image plane, with the second lens group moving along an optical axis, while the imaging optical system is focusing to make a transition from an infinity in-focus state toward a close-object in-focus state.

The first lens group consists of: a sub-lens group G1A; an aperture stop; and a sub-lens group G1B. The sub-lens group G1A, the aperture stop, and the sub-lens group G1B are arranged in this order such that the sub-lens group G1A is located closer to the object than the aperture stop or the sub-lens group G1B is.

The sub-lens group G1A includes, as a plurality of lenses: a lens L1A1 having negative power; a lens L1A2 having negative power; and a lens L1A3 having negative power. The plurality of lenses are arranged such that the lens L1A1 is located closest to the object in the plurality of lenses, the lens L1A2 is located second closest to the object in the plurality of lenses, and the lens L1A3 is located third closest to the object in the plurality of lenses.

A camera system according to another aspect of the present disclosure includes: an interchangeable lens unit including the imaging optical system described above; and a camera body including: an image sensor to receive an optical image formed by the imaging optical system and transform the optical image into an electrical image signal; and a camera mount. The camera body is to be connected removably to the interchangeable lens unit via the camera mount. The interchangeable lens unit forms the optical image of the object on the image sensor.

An image capture device according to still another aspect of the present disclosure transforms an optical image of an object into an electrical image signal and displays and/or stores the electrical image signal thus transformed. The image capture device includes: the imaging optical system described above; and an image sensor. The imaging optical system forms the optical image of the object. The image sensor transforms the optical image formed by the imaging optical system into the electrical image signal.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1A:
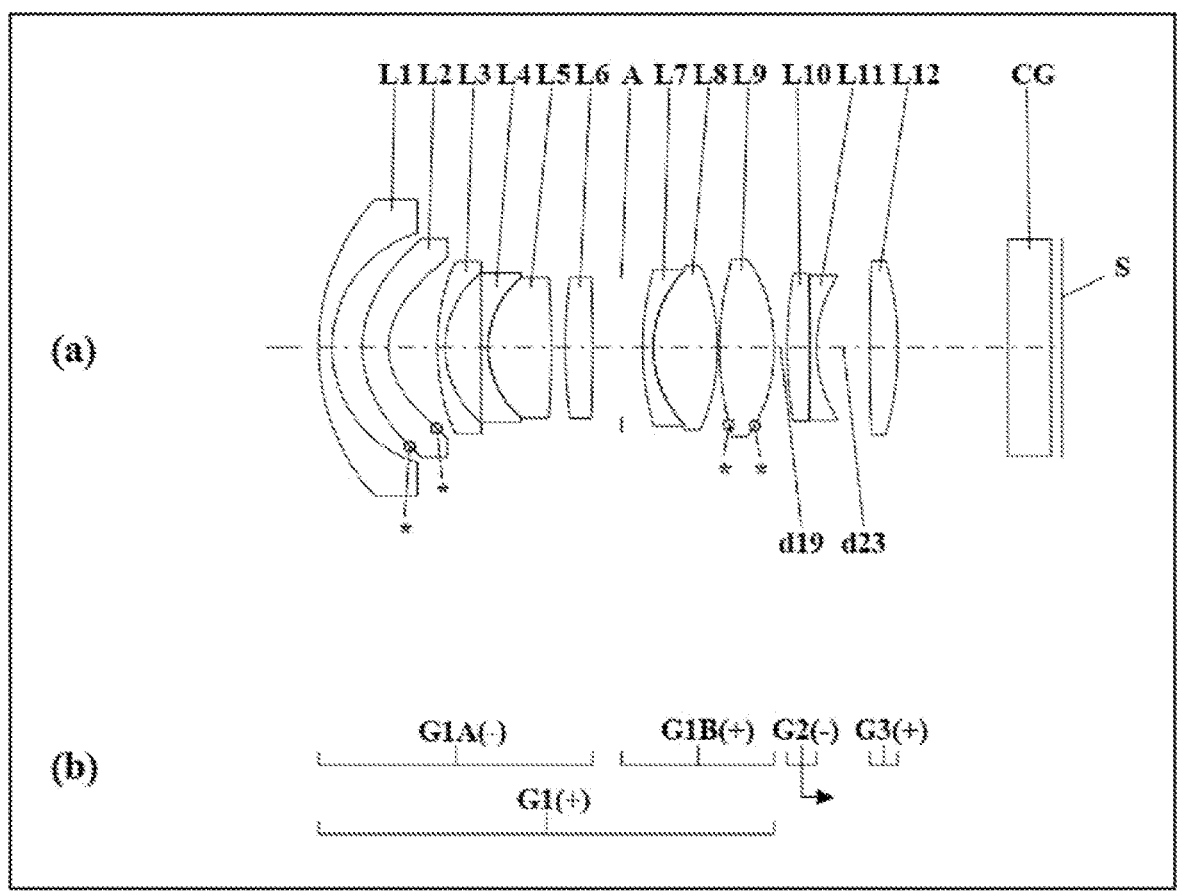
FIG. 1A illustrates lens arrangements showing an infinity in-focus state of an imaging optical system according to a first embodiment (corresponding to a first example of numerical values)
Figure 1B:
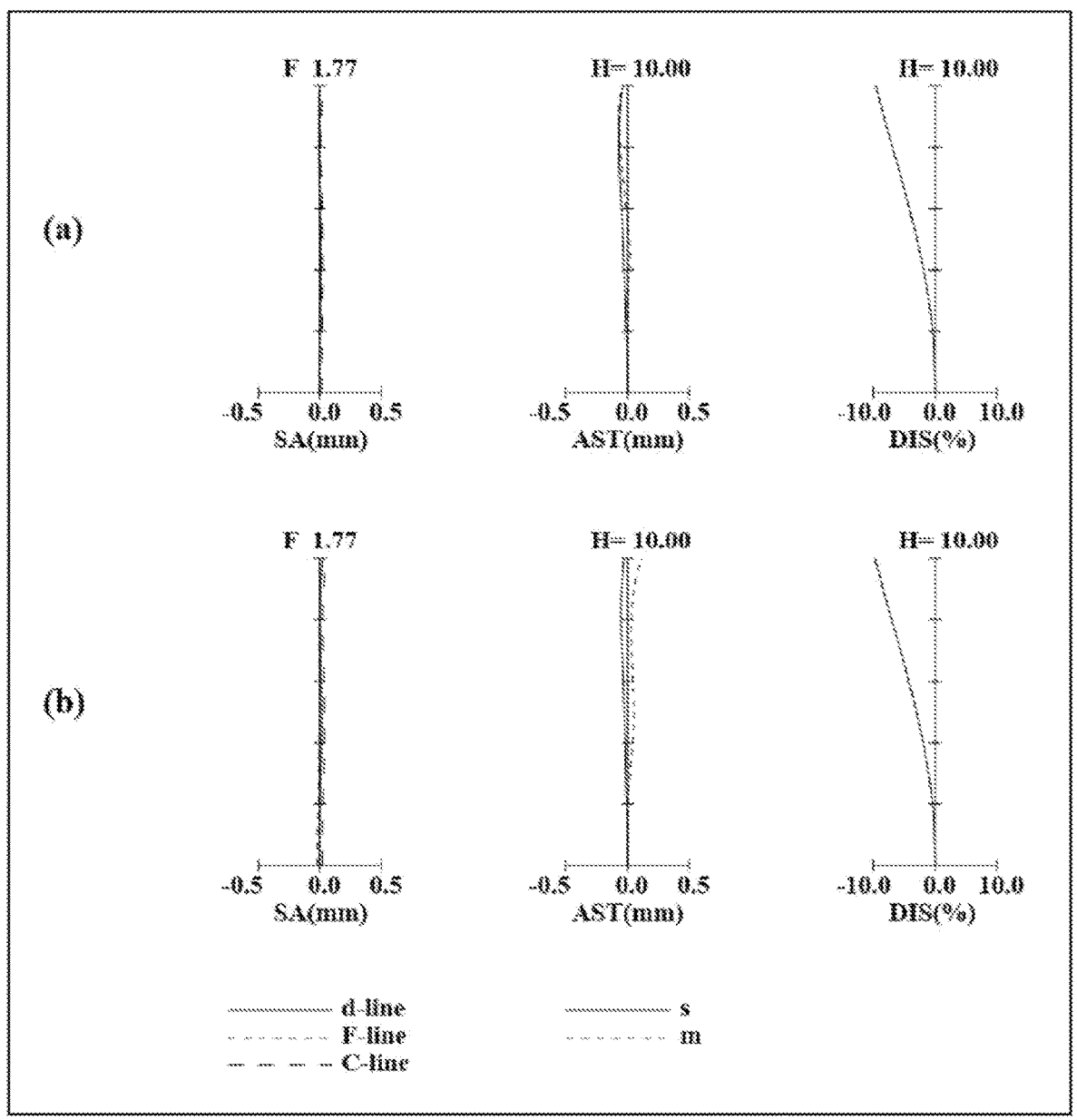
FIG. 1B illustrates longitudinal aberration diagrams showing what state the imaging optical system assumes in the first example of numerical values.

Embodiments of the present disclosure will now be described in detail with reference to the accompanying drawings as appropriate. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

In addition, note that the accompanying drawings and the following description are provided by the applicant to help one of ordinary skill in the art understand the present disclosure fully and should not be construed as limiting the scope of the present disclosure, which is defined by the appended claims.

First to Fourth Embodiments

FIGS. 1A, 2A, 3A, and 4A illustrate lens arrangements and operations of an imaging optical system according to first to fourth embodiments, respectively.

As used herein, the terms "in-focus," "focusing," and "focus" refer to the imaging optical system is "in focus" state, "focusing," and in "focus" unless otherwise stated. In addition, the "optical axis" as used herein refers to the optical axis of the imaging optical system unless otherwise stated. In addition, as used herein, the "positive lens" refers to a lens having positive power and the "negative lens" refers to a lens having negative power.

Portion (a) of FIGS. 1A, 2A, 3A, and 4A illustrates lens arrangements in the infinity in-focus state. In portion (a) of FIGS. 1A, 2A, 3A, and 4A, the straight line drawn at the right end indicates the position of the image plane S (corresponding to a plane on which the image sensor is disposed, and which faces the object as will be described later). Thus, in each of these drawings, the left side corresponds to the object side. In addition, a low-pass filter or cover glass CG, for example, may be arranged between the lens group on the last stage, facing the image plane S, of the imaging optical system and the image plane S. Note that respective portions (a) of FIGS. 1A, 2A, 3A, and 4A have the same aspect ratio.

In portion (a) of FIGS. 1A, 2A, 3A, and 4A, the asterisk (*) attached to a surface of a particular lens indicates that the surface is an aspheric surface. Note that in the lenses, an object-side surface or an image-side surface having no asterisks is a spherical surface.

On the first and second rows of portion (b) of FIGS. 1A, 2A, 3A, and 4A, the respective lens groups are designated by the reference signs G1-G3 corresponding to their respective positions shown in portion (a). Furthermore, the signs (+) and (−) added to the reference signs of the respective lens groups G1-G3 in portion (b) of FIGS. 1A, 2A, 3A, and 4A indicate the powers of the respective lens groups G1-G3. That is to say, the positive sign (+) indicates positive power, and the negative sign (−) indicates negative power.

Also, on the first row of portion (b) of FIGS. 1A, 2A, 3A, and 4A, shown are sub-lens groups of the first lens group G1 shown on the second row of portion (b). The sign (+) or (−) is added to each sub-lens group. The signs (+) and (−) added to the reference signs of the respective sub-lens groups (G1A, G1B) in portion (b) of FIGS. 1A, 2A, 3A, and 4A indicate the powers of the respective sub-lens groups (G1A, G1B). That is to say, the positive sign (+) indicates positive power, and the negative sign (−) indicates negative power.

Also, either on the first row or second row of portion (b) of FIGS. 1A, 2A, 3A, and 4A, an arrow indicating the direction of movement while the imaging optical system is focusing to make a transition from the infinity in-focus state toward the close-object in-focus state is drawn under the reference sign of a particular lens group or particular sub-lens group.

First Embodiment

An imaging optical system according to a first embodiment will be described with reference to FIG. 1A.

FIG. 1A illustrates lens arrangements showing an infinity in-focus state of an imaging optical system according to a first embodiment and also illustrates how the imaging optical system operates in the infinity in-focus state.

As shown in FIG. 1A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other member of the imaging optical system is and that the third lens group G3 is located closer to the image than any other member of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than any other component of the first lens group G1 is and that the sub-lens group G1B is located closer to the image than any other component of the first lens group G1 is.

The sub-lens group G1A is made up of a first lens L1 having negative power, a second lens L2 having negative power, a third lens L3 having negative power, a fourth lens L4 having negative power, a fifth lens L5 having positive power, and a sixth lens L6 having positive power. The first to sixth lenses L1-L6 are arranged in this order such that the first lens L1 is located closest to the object in the sub-lens group G1A and that the sixth lens L6 is located closest to the image in the sub-lens group G1A.

The fourth lens L4 and the fifth lens L5 are bonded together with an adhesive such as a UV curable resin to form a bonded lens. In other words, the bonded lens includes the fourth lens L4 and the fifth lens L5.

The sub-lens group G1B is made up of a seventh lens L7 having negative power, an eighth lens L8 having positive power, and a ninth lens L9 having positive power. The seventh to ninth lenses L7-L9 are arranged in this order such that the seventh lens L7 is located closest to the object in the sub-lens group G1B and that the ninth lens L9 is located closest to the image in the sub-lens group G1B.

The seventh lens L7 and the eighth lens L8 are bonded together with an adhesive such as a UV curable resin to form a bonded lens. In other words, the bonded lens includes the seventh lens L7 and the eighth lens L8.

The second lens group G2 is made up of a tenth lens L10 having positive power and an eleventh lens L11 having negative power. The tenth lens L10 and the eleventh lens L11 are arranged in this order such that the tenth lens L10 is located closer to the object than the eleventh lens L11 is and that the eleventh lens L11 is located closer to the image than the tenth lens L10 is.

The third lens group G3 consists of a twelfth lens L12 having positive power.

The tenth lens L10 and the eleventh lens L11 are bonded together with an adhesive such as a UV curable resin to form a bonded lens. In other words, the bonded lens includes the tenth lens L10 and the eleventh lens L11.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a meniscus lens having a convex surface facing the object. The fourth lens L4 is a plano-concave lens having a concave surface facing the image. The fifth lens L5 is a biconvex lens. The sixth lens L6 is a biconvex lens.

The first lens L1 is an example of the lens L1A1. The second lens L2 is an example of the lens L1A2. The third lens L3 is an example of the lens L1A3. The fourth lens L4 is an example of the lens L1A4.

The fourth lens L4 is an example of the negative lens L1n. The fifth lens L5 is an example of the positive lens L1p.

Next, the respective lenses that form the sub-lens group G1B will be described.

The seventh lens L7 is a meniscus lens having a convex surface facing the object. The eighth lens L8 is a biconvex lens. The ninth lens L9 is a biconvex lens, both surfaces of which are aspheric surfaces.

Next, the respective lenses that form the second lens group G2 will be described.

The tenth lens L10 is a biconvex lens. The eleventh lens L11 is a biconcave lens.

The tenth lens L10 is an example of the positive lens L2p. The eleventh lens L11 is an example of the negative lens L2n.

Next, the lens that forms the third lens group G3 will be described.

The twelfth lens L12 is a biconvex lens.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, the first lens group G1 and the third lens group L3 are fixed with respect to the image plane S.

More specifically, while the imaging optical system is focusing to make a transition from the infinity in-focus state toward the close-object in-focus state, the tenth lens L10 and the eleventh lens L11 move toward the image.

Second Embodiment

Next, an imaging optical system according to a second embodiment will be described with reference to FIG. 2A.

Figure 2A:
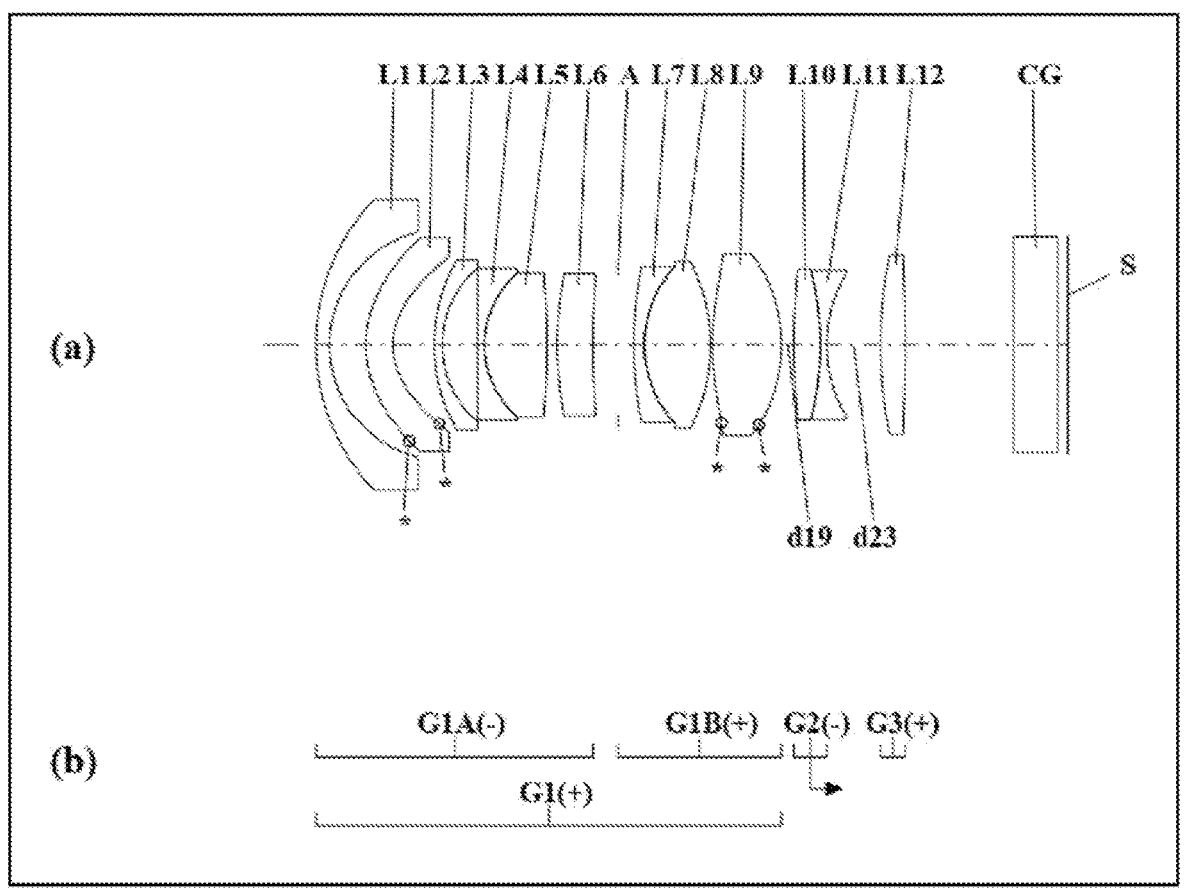
FIG. 2A illustrates lens arrangements showing an infinity in-focus state of an imaging optical system according to a second embodiment (corresponding to a second example of numerical values)
Figure 2B:
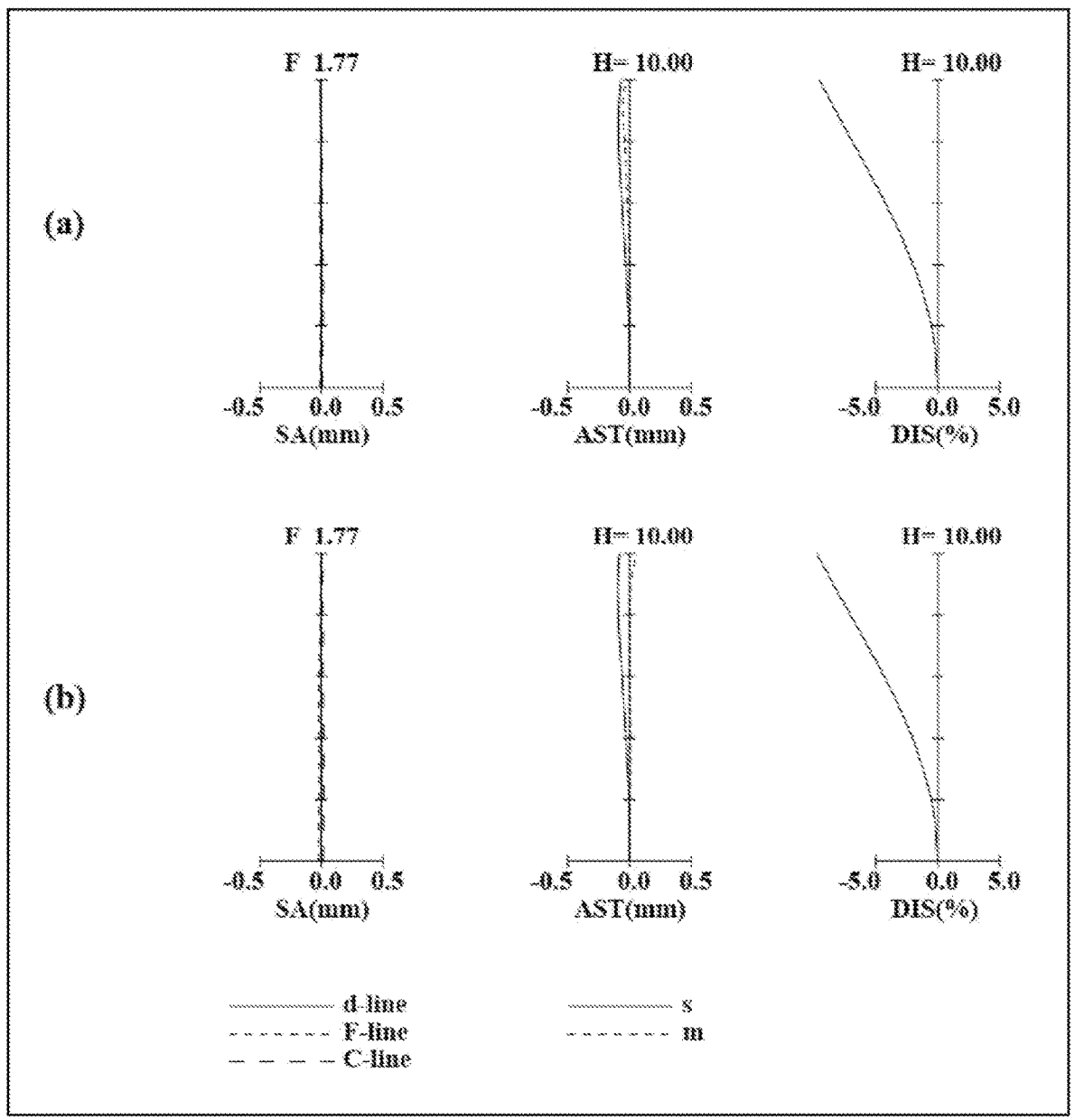
FIG. 2B illustrates longitudinal aberration diagrams showing what state the imaging optical system assumes in the second example of numerical values.

FIG. 2A illustrates lens arrangements showing an infinity in-focus state of an imaging optical system according to a second embodiment and also illustrates how the imaging optical system operates in the infinity in-focus state.

As shown in FIG. 2A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other member of the imaging optical system is and that the third lens group G3 is located closer to the image than any other member of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than any other component of the first lens group G1 is and that the sub-lens group G1B is located closer to the image than any other component of the first lens group G1 is.

The sub-lens group G1A is made up of a first lens L1 having negative power, a second lens L2 having negative power, a third lens L3 having negative power, a fourth lens L4 having negative power, a fifth lens L5 having positive power, and a sixth lens L6 having positive power. The first to sixth lenses L1-L6 are arranged in this order such that the first lens L1 is located closest to the object in the sub-lens group G1A and that the sixth lens L6 is located closest to the image in the sub-lens group G1A.

The fourth lens L4 and the fifth lens L5 are bonded together with an adhesive such as a UV curable resin to form a bonded lens. In other words, the bonded lens includes the fourth lens L4 and the fifth lens L5.

The sub-lens group G1B is made up of a seventh lens L7 having negative power, an eighth lens L8 having positive power, and a ninth lens L9 having positive power. The seventh to ninth lenses L7-L9 are arranged in this order such that the seventh lens L7 is located closest to the object in the sub-lens group G1B and that the ninth lens L9 is located closest to the image in the sub-lens group G1B.

The seventh lens L7 and the eighth lens L8 are bonded together with an adhesive such as a UV curable resin to form a bonded lens. In other words, the bonded lens includes the seventh lens L7 and the eighth lens L8.

The second lens group G2 is made up of a tenth lens L10 having positive power and an eleventh lens L11 having negative power. The tenth lens L10 and the eleventh lens L11 are arranged in this order such that the tenth lens L10 is located closer to the object than the eleventh lens L11 is and that the eleventh lens L11 is located closer to the image than the tenth lens L10 is.

The third lens group G3 consists of a twelfth lens L12 having positive power.

The tenth lens L10 and the eleventh lens L11 are bonded together with an adhesive such as a UV curable resin to form a bonded lens. In other words, the bonded lens includes the tenth lens L10 and the eleventh lens L11.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a meniscus lens having a convex surface facing the object. The fourth lens L4 is a plano-concave lens having a concave surface facing the image. The fifth lens L5 is a biconvex lens. The sixth lens L6 is a meniscus lens having a convex surface facing the object.

The first lens L1 is an example of the lens L1A1. The second lens L2 is an example of the lens L1A2. The third lens L3 is an example of the lens L1A3. The fourth lens L4 is an example of the lens L1A4.

The fourth lens L4 is an example of the negative lens L1n. The fifth lens L5 is an example of the positive lens L1p.

Next, the respective lenses that form the sub-lens group G1B will be described.

The seventh lens L7 is a meniscus lens having a convex surface facing the object. The eighth lens L8 is a biconvex lens. The ninth lens L9 is a biconvex lens, both surfaces of which are aspheric surfaces.

Next, the respective lenses that form the second lens group G2 will be described.

The tenth lens L10 is a biconvex lens. The eleventh lens L11 is a biconcave lens.

The tenth lens L10 is an example of the positive lens L2p. The eleventh lens L11 is an example of the negative lens L2n.

Next, the lens that forms the third lens group G3 will be described.

The twelfth lens L12 is a biconvex lens.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, the first lens group G1 and the third lens group L3 are fixed with respect to the image plane S.

More specifically, while the imaging optical system is focusing to make a transition from the infinity in-focus state toward the close-object in-focus state, the tenth lens L10 and the eleventh lens L11 move toward the image.

Third Embodiment

Next, an imaging optical system according to a third embodiment will be described with reference to FIG. 3A.

Figure 3A:
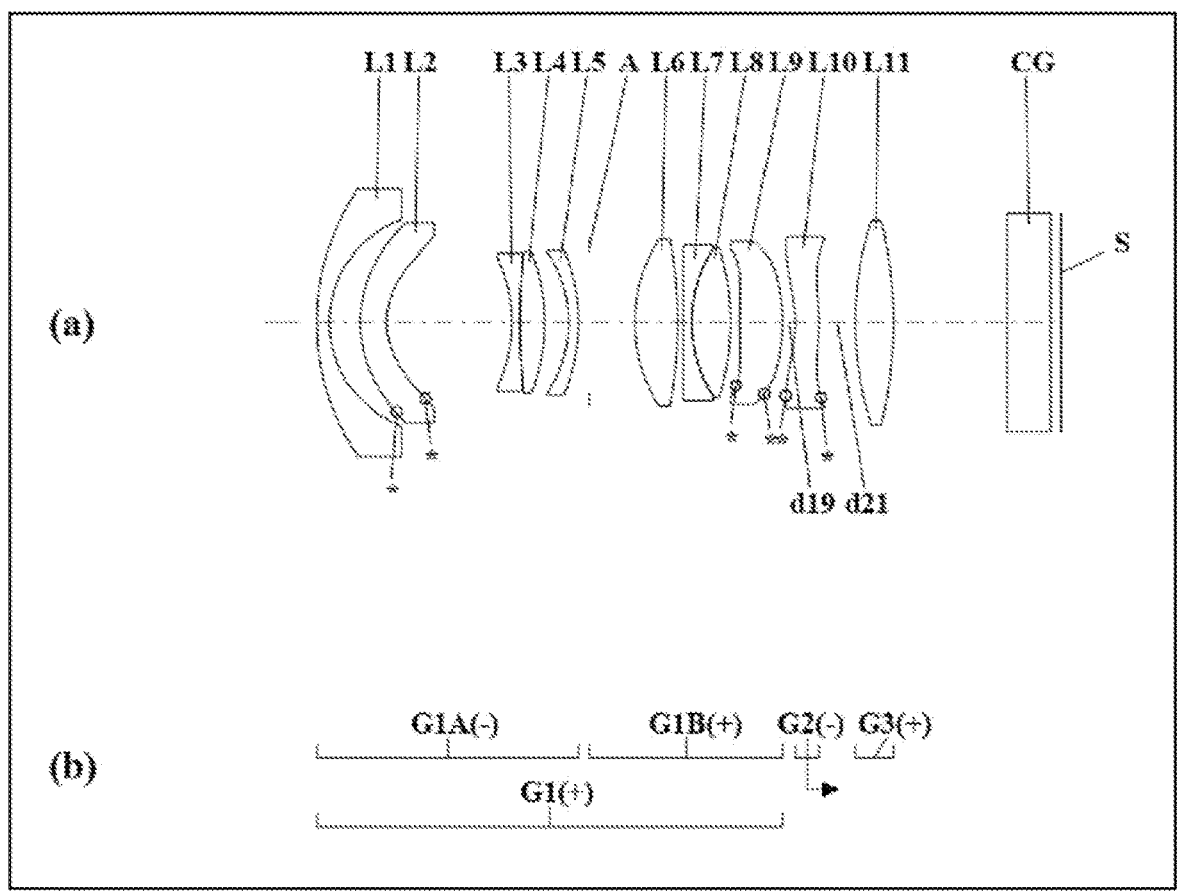
FIG. 3A illustrates lens arrangements showing an infinity in-focus state of an imaging optical system according to a third embodiment (corresponding to a third example of numerical values)
Figure 3B:
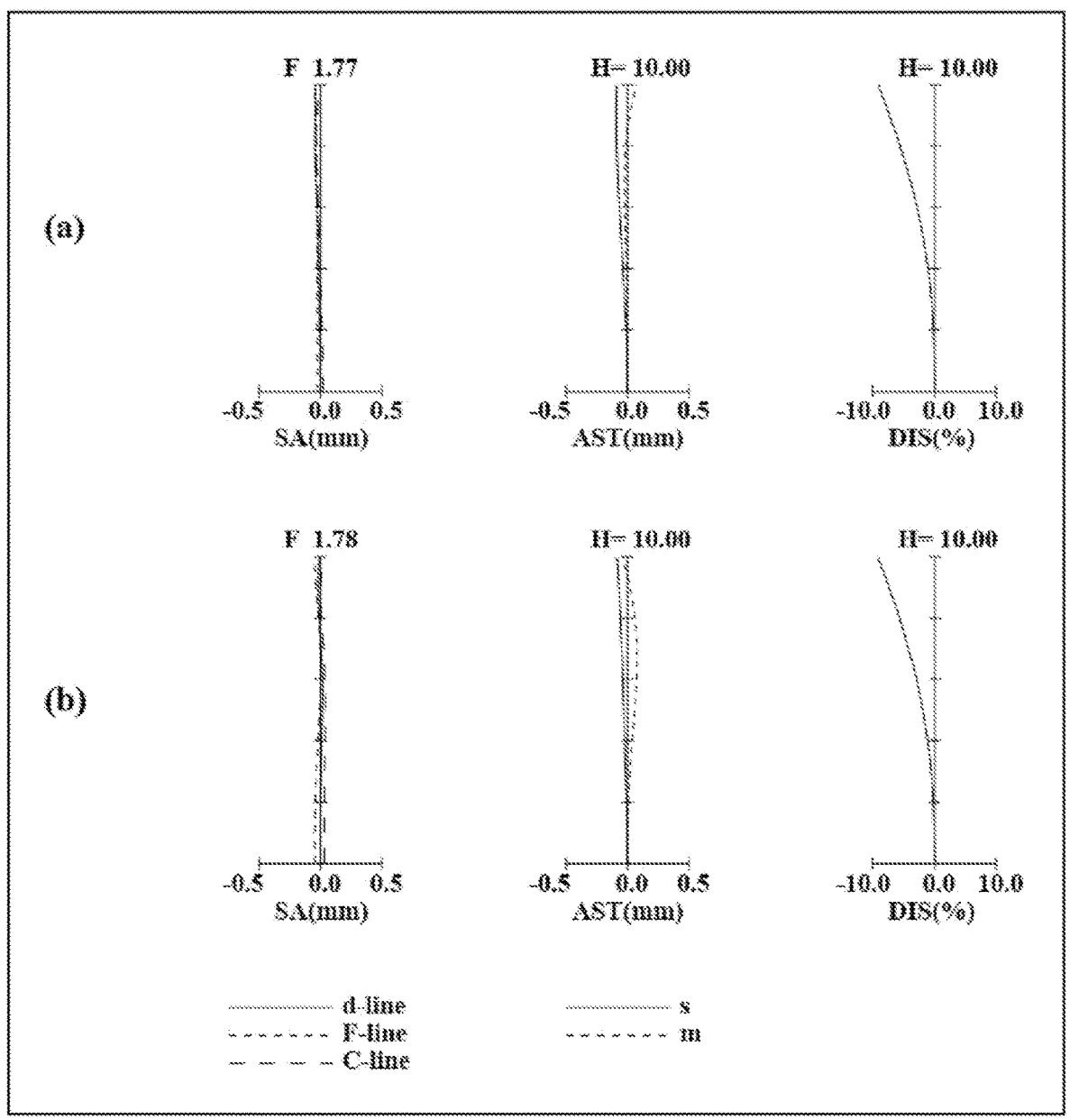
FIG. 3B illustrates longitudinal aberration diagrams showing what state the imaging optical system assumes in the third example of numerical values.

FIG. 3A illustrates lens arrangements showing an infinity in-focus state of an imaging optical system according to a third embodiment and also illustrates how the imaging optical system operates in the infinity in-focus state.

As shown in FIG. 3A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other member of the imaging optical system is and that the third lens group G3 is located closer to the image than any other member of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than any other component of the first lens group G1 is and that the sub-lens group G1B is located closer to the image than any other component of the first lens group G1 is.

The sub-lens group G1A is made up of a first lens L1 having negative power, a second lens L2 having negative power, a third lens L3 having negative power, a fourth lens L4 having positive power, and a fifth lens L5 having negative power. The first to fifth lenses L1-L5 are arranged in this order such that the first lens L1 is located closest to the object in the sub-lens group G1A and that the fifth lens L5 is located closest to the image in the sub-lens group G1A.

The third lens L3 and the fourth lens L4 are bonded together with an adhesive such as a UV curable resin to form a bonded lens. In other words, the bonded lens includes the third lens L3 and the fourth lens L4.

The sub-lens group G1B is made up of a sixth lens L6 having positive power, a seventh lens L7 having negative power, an eighth lens L8 having positive power, and a ninth lens L9 having positive power. The sixth to ninth lenses L6-L9 are arranged in this order such that the sixth lens L6 is located closest to the object in the sub-lens group G1B and that the ninth lens L9 is located closest to the image in the sub-lens group G1B.

The seventh lens L7 and the eighth lens L8 are bonded together with an adhesive such as a UV curable resin to form a bonded lens. In other words, the bonded lens includes the seventh lens L7 and the eighth lens L8.

The second lens group G2 consists of a tenth lens L10 having negative power.

The third lens group G3 consists of an eleventh lens L11 having positive power.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a biconvex lens. The fifth lens L5 is a meniscus lens having a convex surface facing the image.

The first lens L1 is an example of the lens L1A1. The second lens L2 is an example of the lens L1A2. The third lens L3 is an example of the lens L1A3.

The third lens L3 is an example of the negative lens L1n. The fourth lens L4 is an example of the positive lens L1p.

Next, the respective lenses that form the sub-lens group G1B will be described.

The sixth lens L6 is a biconvex lens. The seventh lens L7 is a plano-concave lens having a concave surface facing the image. The eighth lens L8 is a biconvex lens. The ninth lens L9 is a biconvex lens, both surfaces of which are aspheric surfaces.

Next, the lens that forms the second lens group G2 will be described.

The tenth lens L10 is a meniscus lens having a convex surface facing the image. Both surfaces of the tenth lens L10 are aspheric surfaces.

Next, the lens that forms the third lens group G3 will be described.

The eleventh lens L11 is a biconvex lens.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, the first lens group G1 and the third lens group L3 are fixed with respect to the image plane S.

More specifically, while the imaging optical system is focusing to make a transition from the infinity in-focus state toward the close-object in-focus state, the tenth lens L10 moves toward the image.

Fourth Embodiment

Next, an imaging optical system according to a fourth embodiment will be described with reference to FIG. 4A.

Figure 4A:
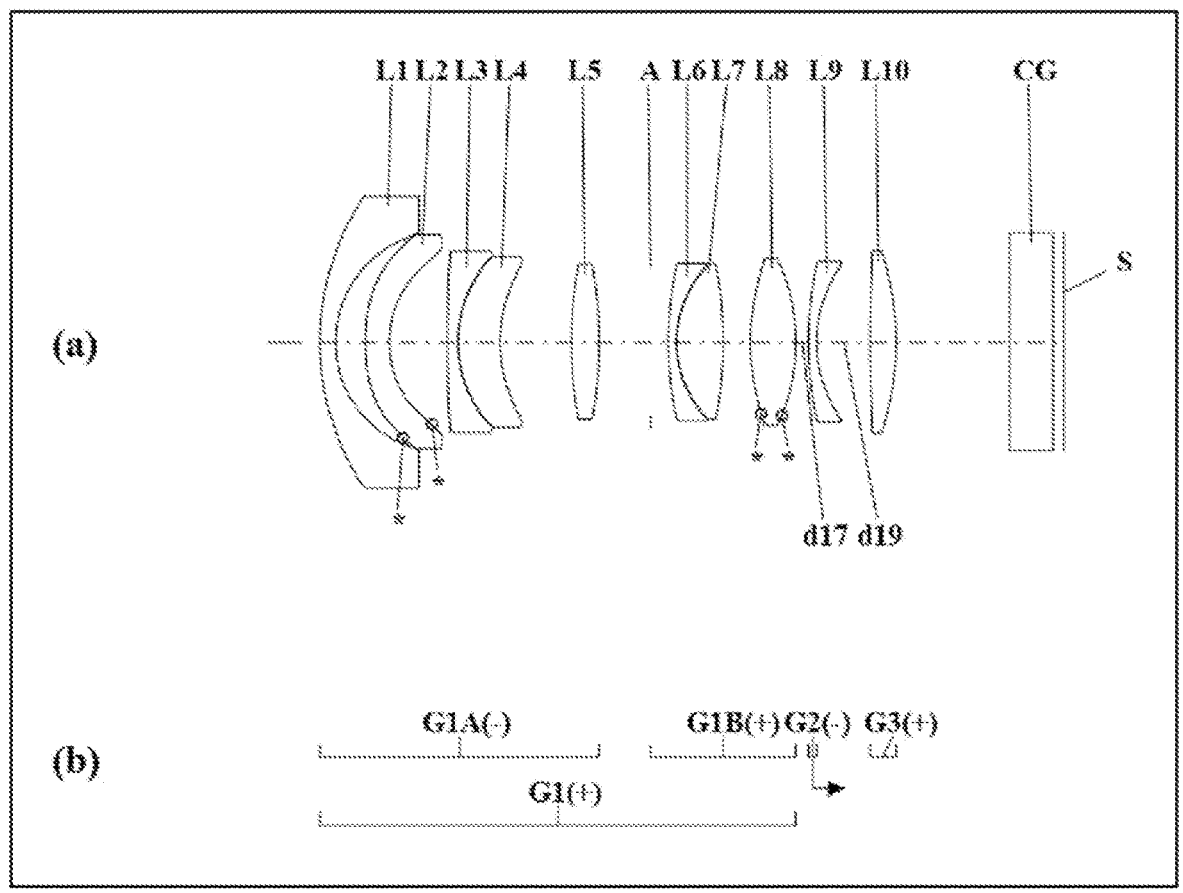
FIG. 4A illustrates lens arrangements showing an infinity in-focus state of an imaging optical system according to a fourth embodiment (corresponding to a fourth example of numerical values)
Figure 4B:
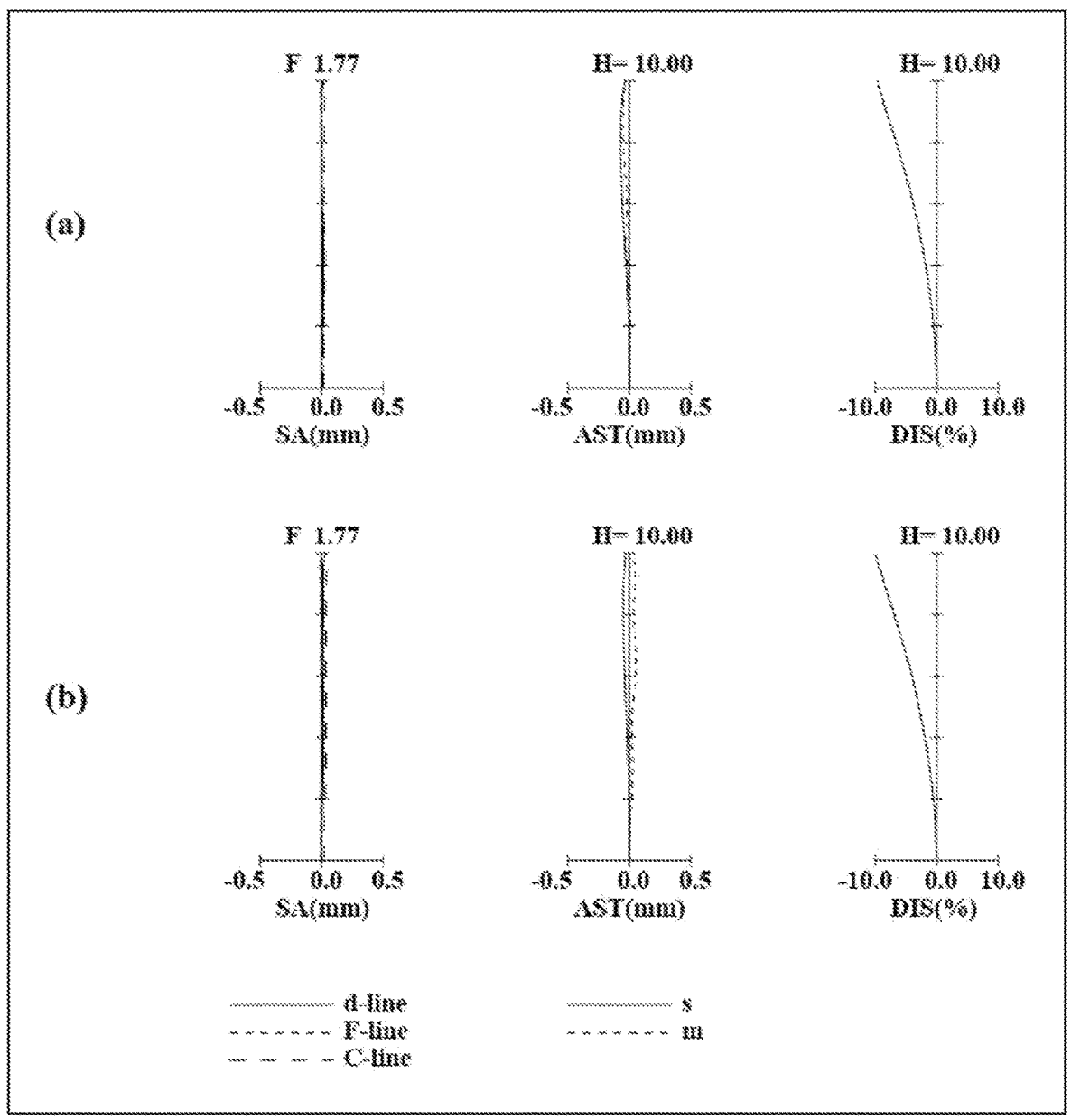
FIG. 4B illustrates longitudinal aberration diagrams showing what state the imaging optical system assumes in the fourth example of numerical values.

FIG. 4A illustrates lens arrangements showing an infinity in-focus state of an imaging optical system according to a fourth embodiment and also illustrates how the imaging optical system operates in the infinity in-focus state.

As shown in FIG. 4A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other member of the imaging optical system is and that the third lens group G3 is located closer to the image than any other member of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than any other component of the first lens group G1 is and that the sub-lens group G1B is located closer to the image than any other component of the first lens group G1 is.

The sub-lens group G1A is made up of a first lens L1 having negative power, a second lens L2 having negative power, a third lens L3 having negative power, a fourth lens L4 having positive power, and a fifth lens L5 having positive power. The first to fifth lenses L1-L5 are arranged in this order such that the first lens L1 is located closest to the object in the sub-lens group G1A and that the fifth lens L5 is located closest to the image in the sub-lens group G1A.

The third lens L3 and the fourth lens L4 are bonded together with an adhesive such as a UV curable resin to form a bonded lens. In other words, the bonded lens includes the third lens L3 and the fourth lens L4.

The sub-lens group G1B is made up of a sixth lens L6 having negative power, a seventh lens L7 having positive power, and an eighth lens L8 having positive power. The sixth to eighth lenses L6-L8 are arranged in this order such that the sixth lens L6 is located closest to the object in the sub-lens group G1B and that the eighth lens L8 is located closest to the image in the sub-lens group G1B.

The sixth lens L6 and the seventh lens L7 are bonded together with an adhesive such as a UV curable resin to form a bonded lens. In other words, the bonded lens includes the sixth lens L6 and the seventh lens L7.

The second lens group G2 consists of a ninth lens L9 having negative power.

The third lens group G3 consists of a tenth lens L10 having positive power.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a meniscus lens having a convex surface facing the object. The fourth lens L4 is a meniscus lens having a convex surface facing the object. The fifth lens L5 is a biconvex lens.

The first lens L1 is an example of the lens L1A1. The second lens L2 is an example of the lens L1A2. The third lens L3 is an example of the lens L1A3.

The third lens L3 is an example of the negative lens L1$n$.
The fourth lens L4 is an example of the positive lens L1$p$.

Next, the respective lenses that form the sub-lens group G1B will be described.

The sixth lens L6 is a meniscus lens having a convex surface facing the object. The seventh lens L7 is a biconvex lens. The eighth lens L8 is a biconvex lens, both surfaces of which are aspheric surfaces.

Next, the lens that forms the second lens group G2 will be described.

The ninth lens L9 is a meniscus lens having a convex surface facing the object.

Next, the lens that forms the third lens group G3 will be described.

The tenth lens L11 is a biconvex lens.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, the first lens group G1 and the third lens group L3 are fixed with respect to the image plane S.

More specifically, while the imaging optical system is focusing to make a transition from the infinity in-focus state toward the close-object in-focus state, the ninth lens L9 moves toward the image.

Conditions and Advantages

Next, conditions that an imaging optical system such as the ones according to the first to fourth embodiments described above may satisfy will be described. That is to say, a plurality of conditions may be defined for the imaging optical system according to each of these four embodiments. In that case, an imaging optical system, of which the configuration satisfies all of these conditions, is most advantageous. Alternatively, an imaging optical system that achieves its expected advantages by satisfying any of the individual conditions to be described below may also be provided.

As in the imaging optical system according to each of the first to fourth embodiments described above, for example, an imaging optical system according to the present disclosure consists of: a first lens group G1 having positive power; a second lens group G2 having negative power; and a third lens group G3 having positive power. The first lens group G1, the second lens group G2, and the third lens group G3 are arranged in this order such that the first lens group G1 is located closer to an object than any other lens group of the imaging optical system is.

The first lens group G1 and the third lens group G3 are fixed with respect to an image plane S and the second lens group G2 moves along an optical axis while the imaging optical system is focusing to make a transition from an infinity in-focus state toward a close-object in-focus state.

The first lens group G1 consists of: a sub-lens group G1A; an aperture stop A; and a sub-lens group G1B. The sub-lens group G1A, the aperture stop A, and the sub-lens group G1B are arranged in this order such that the sub-lens group G1A is located closer to the object than any other component of the first lens group G1 is.

The sub-lens group G1A includes: a lens L1A1 having negative power; a lens L1A2 having negative power; and a lens L1A3 having negative power. The lenses L1A1, L1A2, and L1A3 are arranged in this order such that the lens L1A1 is located closer to the object than any other component of the sub-lens group G1A is.

In this basic configuration, this power arrangement in the first, second, and third lens groups G1, G2, G3 may have the aberration generated by the first lens group G1 (in particular, the field curvature at the wide-angle end) effectively canceled by the third lens group G3. This contributes to downsizing the first lens group G1 by giving intense power to the first lens group G1, while at the same time, having the aberration thus generated canceled by the third lens group G3. In addition, providing the aperture stop A in the first lens group G1 allows the lenses located closer to the image than the aperture stop A to have reduced diameters while providing a sufficient interval between the aperture stop A and the image plane S. This contributes to downsizing the imaging optical system. Furthermore, arranging at least three negative lenses consecutively and sequentially in the sub-lens group G1A such that one of the three negative lenses is located closest to the object enables compensating for various types of aberrations (in particular, the distortion) sufficiently while making the angle of view even wider, even though the F number is as large as 2.0 or less.

In an imaging optical system having the basic configuration described above, the sub-lens group G1A preferably further includes a lens L1A4 having negative power and disposed fourth closest to the object in the plurality of lenses included in the sub-lens group G1A.

This enables compensating for various aberrations (such as the distortion, among other things) while making the angle of view even wider.

Also, an imaging optical system having the basic configuration preferably satisfies the condition expressed by the following Inequality (1):

$$0.9 < DL1A2/DL1A1 \tag{1}$$

where DL1A1 is the thickness of the lens L1A1 on the optical axis and DL1A2 is the thickness of the lens L1A2 on the optical axis. Note that the units of these parameters should be the same (e.g., the units of DL1A1 and DL1A2 are both millimeters).

The condition expressed by this Inequality (1) defines a preferred ratio of the thickness of the lens L1A2 on the optical axis to the thickness of the lens L1A1 on the optical axis.

If DL1A2/DL1A1 were equal to or less than the lower limit value set by this Inequality (1), then the lens L1A1 would be so thick and have so large an outside diameter as to make it difficult to downsize the lens L1A1.

Also, within the range defined by Inequality (1), the condition expressed by the following Inequality (1a) is preferably satisfied:

$$DL1A2/DL1A1 < 6.0 \tag{1a}$$

If DL1A2/DL1A1 were equal to or greater than the upper limit value set by this Inequality (1a), then the lens L1A1 would be too thin to manufacture the lens easily.

To enhance the advantage described above, at least one of the conditions expressed by the following Inequalities (1b) and (1c) is preferably satisfied:

$$1.2 < DL1A2/DL1A1 \tag{1b}$$

$$DL1A2/DL1A1 < 5.0 \tag{1c}$$

To further enhance the advantage described above, at least one of the conditions expressed by the following Inequalities (1d) and (1e) is more preferably satisfied:

$$1.5 < DL1A2/DL1A1 \tag{1d}$$

$$DL1A2/DL1A1 < 4.0 \tag{1e}$$

Also, an imaging optical system having the basic configuration preferably satisfies the condition expressed by the following Inequality (2):

$$1.0 < DL1A2/DL1A3 \tag{2}$$

where DL1A2 is the thickness of the lens L1A2 on the optical axis, and DL1A3 is the thickness of the lens L1A3 on the optical axis. Note that the units of these parameters should be the same (e.g., the units of DL1A2 and DL1A3 are both millimeters).

The condition expressed by this Inequality (2) defines a preferred ratio of the thickness of the lens L1A2 on the optical axis to the thickness of the lens L1A3 on the optical axis.

If DL1A2/DL1A3 were equal to or less than the lower limit value set by this Inequality (2), then the lens L1A3 would be too thick and have too long a total lens length to downsize the lens L1A3 easily.

Also, within the range defined by Inequality (2), the condition expressed by the following Inequality (2a) is preferably satisfied:

$$DL1A2/DL1A3 < 6.0 \tag{2a}$$

If DL1A2/DL1A3 were equal to or greater than the upper limit value set by this Inequality (2a), then the lens L1A3 would be too thin to manufacture the lens L1A3 easily.

To enhance the advantage described above, at least one of the conditions expressed by the following Inequalities (2b) and (2c) is preferably satisfied:

$$1.5 < DL1A2/DL1A3 \tag{2b}$$

$$DL1A2/DL1A3 < 4.5 \tag{2c}$$

To further enhance the advantage described above, at least one of the conditions expressed by the following Inequalities (2d) and (2e) is more preferably satisfied:

$$2.0 < DL1A2/DL1A3 \tag{2d}$$

$$DL1A2/DL1A3 < 3.5 \tag{2e}$$

Also, an imaging optical system having the basic configuration preferably satisfies the condition expressed by the following Inequality (3):

$$0.7 < DL1A2/(DL1A1 + DL1A3) \tag{3}$$

where DL1A1 is the thickness of the lens L1A1 on the optical axis, DL1A2 is the thickness of the lens L1A2 on the optical axis, and DL1A3 is the thickness of the lens L1A3 on the optical axis. Note that the units of these parameters should be the same (e.g., the units of DL1A1, DL1A2, and DL1A3 are millimeters).

The condition expressed by this Inequality (3) defines a preferred ratio of the thickness of the lens L1A2 on the optical axis to the sum of the respective thicknesses of the lens L1A1 and L1A3 on the optical axis.

If DL1A2/(DL1A1+DL1A3) were equal to or less than the lower limit value set by this Inequality (3), then the lens L1A2 would be so thin as to require using a lens having a large thickness deviation ratio to compensate for the various aberrations sufficiently. This would make it difficult to manufacture such a lens L1A2 and would often cause an increase in profile irregularity.

Also, within the range defined by Inequality (3), the condition expressed by the following Inequality (3a) is preferably satisfied:

$$DL1A2/(DL1A1+DL1A3)<6.0 \tag{3a}$$

If DL1A2/(DL1A1+DL1A3) were equal to or greater than the upper limit value set by this Inequality (3a), then the lens L1A2 would be so thick and have so long a total lens length as to make it difficult to downsize the lens L1A2.

To enhance the advantage described above, at least one of the conditions expressed by the following Inequalities (3b) and (3c) is preferably satisfied:

$$0.8<DL1A2/(DL1A1+DL1A3) \tag{3b}$$

$$DL1A2/(DL1A1+DL1A3)<4.0 \tag{3c}$$

To further enhance the advantage described above, at least one of the conditions expressed by the following Inequalities (3d) and (3e) is more preferably satisfied:

$$0.9<DL1A2/(DL1A1+DL1A3) \tag{3d}$$

$$DL1A2/(DL1A1+DL1A3)<2.0 \tag{3e}$$

Also, an imaging optical system having the basic configuration preferably satisfies the condition expressed by the following Inequality (4):

$$0.3<f/D<1.0 \tag{4}$$

where f is a focal length of the imaging optical system in the infinity in-focus state and D is a distance on the optical axis from a surface, located closest to the object, in the first lens group G1 to an image-side surface of a lens located fourth closest to the object in the first lens group G1 (i.e., the distance from the object-side surface of the first lens L1 to the image-side surface of the fourth lens L4). Note that the units of these parameters should be the same (e.g., the units off and D are millimeters).

The condition expressed by this Inequality (4) defines a preferred ratio of the focal length of the imaging optical system in the infinity in-focus state to the distance on the optical axis from a surface, located closest to the object, in the first lens group G1 to an image-side surface of a lens located fourth closest to the object in the first lens group G1.

If f/D were equal to or less than the lower limit value set by this Inequality (4), then the distance on the optical axis from the surface, located closest to the object, in the first lens group G1 to the image-side surface of the lens located fourth closest to the object in the first lens group G1 would be too long and the total lens length would also be too long to downsize the first lens group G1 easily.

Meanwhile, if f/D were equal to or greater than the upper limit value set by this Inequality (4), then the interval between the lens surfaces would be so narrow as to allow the lenses to interfere with each other easily. This would make it difficult to leave a space needed to align their centers with each other, thus increasing the chances of causing dispersion between products due to, for example, manufacturing error, which is an unfavorable situation.

To enhance the advantage described above, at least one of the conditions expressed by the following Inequalities (4a) and (4b) is preferably satisfied:

$$0.4<f/D \tag{4a}$$

$$f/D<0.8 \tag{4b}$$

To further enhance the advantage described above, at least one of the conditions expressed by the following Inequalities (4c) and (4d) is more preferably satisfied:

$$0.5<f/D \tag{4c}$$

$$f/D<0.6 \tag{4d}$$

Also, an imaging optical system having the basic configuration preferably satisfies the condition expressed by the following Inequality (5):

$$0.3<BF/Y<2.0 \tag{5}$$

where BF is a back focus of the imaging optical system (i.e., the distance on the optical axis from a lens surface located closest to the image to the image plane S), and Y is an image height of the imaging optical system in the infinity in-focus state. Note that the units of these parameters should be the same (e.g., the units of BF and Y are millimeters).

The condition expressed by this Inequality (5) defines a preferred ratio of the back focus of the imaging optical system to the image height of the imaging optical system in the infinity in-focus state.

If BF/Y were equal to or less than the lower limit value set by this Inequality (5), then the back focus would be too short to avoid causing interference between the lens closest to the image plane S and the image capturing plane, which is an unfavorable situation.

If BF/Y were equal to or greater than the upper limit value set by this Inequality (5), then the back focus would be too long to avoid increasing the overall size of the imaging optical system.

To enhance the advantage described above, at least one of the conditions expressed by the following Inequalities (5a) and (5b) is preferably satisfied:

$$0.7<BF/Y \tag{5a}$$

$$BF/Y<1.8 \tag{5b}$$

To further enhance the advantage described above, at least one of the conditions expressed by the following Inequalities (5c) and (5d) is more preferably satisfied:

$$1.3<BF/Y \tag{5c}$$

$$BF/Y<1.6 \tag{5d}$$

Furthermore, in an imaging optical system having the basic configuration, at least one negative lens belonging to the sub-lens group G1A preferably satisfies the condition expressed by the following Inequality (6):

$$vdL1An>62 \tag{6}$$

where vdL1An is an Abbe number of the at least one negative lens in the sub-lens group G1A in response to a d-line.

The condition expressed by this Inequality (6) defines a preferred Abbe number of the negative lens in the sub-lens group G1A in response to a d-line.

If vdL1An were equal to or less than the lower limit value set by this Inequality (6), then it would be difficult to compensate for various aberrations (such as a chromatic aberration of magnification, among other things).

To enhance the advantage described above, the condition expressed by the following Inequality (6a) is preferably satisfied:

$$vdL1An > 65 \quad (6a)$$

To further enhance the advantage described above, the condition expressed by the following Inequality (6b) is more preferably satisfied:

$$vdL1An > 67 \quad (6b)$$

Furthermore, in an imaging optical system having the basic configuration, the sub-lens group G1A preferably includes a bonded lens formed by a positive lens L1p and a negative lens L1n, and the imaging optical system preferably satisfies the condition expressed by the following Inequality (7):

$$1.4 < ndL1n < 1.65 \quad (7)$$

where ndL1n is a refractive index of the negative lens L1n in response to a d-line.

The condition expressed by this Inequality (7) defines a refractive index of the negative lens L1n in response to a d-line.

If ndL1n were equal to or less than the lower limit value set by this Inequality (7), then the absolute value of the Petzval sum would be so large as to make it difficult to compensate for the field curvature.

If ndL1n were equal to or greater than the upper limit value set by this Inequality (7), then a high-dispersion material should be selected, thus making it difficult to compensate for the chromatic aberration.

To enhance the advantage described above, at least one of the conditions expressed by the following Inequalities (7a) and (7b) is preferably satisfied:

$$1.47 < ndL1n \quad (7a)$$

$$ndL1n < 1.61 \quad (7b)$$

To further enhance the advantage described above, at least one of the conditions expressed by the following Inequalities (7c) and (7d) is more preferably satisfied:

$$1.49 < ndL1n \quad (7c)$$

$$ndL1n < 1.58 \quad (7d)$$

Furthermore, in an imaging optical system having the basic configuration described above, the second lens group G2 preferably includes a bonded lens formed by a positive lens L2p and a negative lens L2n, and the imaging optical system preferably satisfies the condition expressed by following Inequality (8):

$$1.85 < ndL2p \quad (8)$$

where ndL2p is a refractive index of the positive lens L2p in response to a d-line.

The condition expressed by this Inequality (8) defines a refractive index of the positive lens L2p in response to a d-line.

If ndL2p were equal to or less than the lower limit value set by this Inequality (8), then the chromatic aberration could not be compensated for at the minimum object distance, thus causing a decline in close-up shooting performance.

To enhance the advantage described above, the condition expressed by the following Inequality (8a) is preferably satisfied:

$$1.90 < ndL2p \quad (8a)$$

To further enhance the advantage described above, the condition expressed by the following Inequality (8b) is more preferably satisfied:

$$1.94 < ndL2p \quad (8b)$$

Also, an imaging optical system having the basic configuration preferably satisfies the condition expressed by the following Inequality (9):

$$0.5 < Ls/LL \quad (9)$$

where Ls is a distance on the optical axis from the aperture stop A to the image plane S, and LL is a total optical length of the imaging optical system in the infinity in-focus state. Note that the units of these parameters should be the same (e.g., the units of Ls and LL are both millimeters).

The condition expressed by the Inequality (9) defines a preferred ratio of a distance on the optical axis from the aperture stop A to the image plane S to a total optical length of the imaging optical system in the infinity in-focus state.

If Ls/LL were equal to or less than the lower limit value set by this Inequality (9), then the lens arrangement located closer to the image plane than the aperture stop A would have an excessively large size.

Also, within the range defined by Inequality (9), the condition expressed by the following Inequality (9a) is preferably satisfied:

$$Ls/LL < 0.8 \quad (9a)$$

If Ls/LL were equal to or greater than the upper limit value set by this Inequality (9a), then the number of lenses located closer to the object than the aperture stop A would be too limited to compensate for the chromatic aberration easily.

To enhance the advantage described above, at least one of the conditions expressed by the following Inequalities (9b) and (9c) is preferably satisfied:

$$0.55 < Ls/LL \quad (9b)$$

$$Ls/LL < 0.7 \quad (9c)$$

To further enhance the advantage described above, at least one of the conditions expressed by the following Inequalities (9d) and (9e) is more preferably satisfied:

$$0.57 < Ls/LL \quad (9d)$$

$$Ls/LL < 0.65 \quad (9e)$$

Furthermore, in an imaging optical system having the basic configuration, the sub-lens group G1B preferably includes at least one positive lens and satisfies the condition expressed by the following Inequality (10):

$$vdL1Bp > 65 \quad (10)$$

where vdL1Bp is an Abbe number of the at least one positive lens in the sub-lens group G1B in response to a d-line.

The condition expressed by the Inequality (10) defines an Abbe number of a positive lens in the sub-lens group G1B in response to a d-line.

If vdL1Bp were equal to or less than the lower limit value set by this Inequality (10), then it would be difficult to compensate for various types of aberrations (such as chromatic aberration of magnification, among other things).

To enhance the advantage described above, the condition expressed by the following Inequality (10a) is preferably satisfied:

$$vdL1Bp > 70 \quad (10a)$$

To further enhance the advantage described above, the condition expressed by the following Inequality (10b) is more preferably satisfied:

$$vdL1Bp > 80 \qquad (10b).$$

Furthermore, in an imaging optical system having the basic configuration, the second lens group G2 preferably consists of at most two lenses.

Such a configuration allows the focus group to have a lighter weight, thus realizing focusing with higher speeds.

Also, an imaging optical system having the basic configuration preferably satisfies the condition expressed by the following Inequality (11):

$$0.08 < |fG1/fL1A2| < 0.3 \qquad (11)$$

where fG1 is a focal length of the first lens group G1, and fL1A2 is a focal length of the lens L1A2. Note that the units of these parameters should be the same (e.g., the units of fG1 and fL1A2 are both millimeters).

The condition expressed by this Inequality (11) defines a preferred ratio of the power of the first lens group G1 to the power of the lens L1A2.

If |fG1/fL1A2| were equal to or less than the lower limit value set by this Inequality (11), then the power of the lens L1A2 would be too low to compensate for the distortion easily.

If |fG1/fL1A2| were equal to or greater than the upper limit value set by this Inequality (11), then the power of the lens L1A2 would be so high and the lens surface thereof would have so large a tilt angle that it would be difficult to manufacture the lens L1A2.

To enhance the advantage described above, at least one of the conditions expressed by the following Inequalities (11a) and (11b) is preferably satisfied:

$$0.1 < |fG1/fL1A2| \qquad (11a)$$

$$|fG1/fL1A2| < 0.25 \qquad (11b).$$

To further enhance the advantage described above, at least one of the conditions expressed by the following Inequalities (11c) and (11d) is more preferably satisfied:

$$0.12 < |fG1/fL1A2| \qquad (11c)$$

$$|fG1/fL1A2| < 0.2 \qquad (11d).$$

Also, an imaging optical system having the basic configuration preferably satisfies the condition expressed by the following Inequality (12):

$$1.45 < ndL1A2 < 1.60 \qquad (12)$$

where ndL1A2 is a refractive index of the lens L1A2 in response to a d-line.

The condition expressed by this Inequality (12) defines a refractive index of the lens L1A2 in response to a d-line.

If ndL1A2 were equal to or less than the lower limit value set by this Inequality (12), then the absolute value of the Petzval sum would be so large as to make it difficult to compensate for the field curvature.

If ndL1A2 were equal to or greater than the upper limit value set by this Inequality (12), then a high-dispersion material should be selected, thus making it difficult to compensate for the chromatic aberration, which is an unfavorable situation.

To enhance the advantage described above, at least one of the conditions expressed by the following Inequalities (12a) and (12b) is preferably satisfied:

$$1.48 < ndL1A2 \qquad (12a)$$

$$ndL1A2 < 1.58 \qquad (12b).$$

To further enhance the advantage described above, at least one of the conditions expressed by the following Inequalities (12c) and (12d) is more preferably satisfied:

$$1.50 < ndL1A2 \qquad (12c)$$

$$ndL1A2 < 1.55 \qquad (12d).$$

Also, an imaging optical system having the basic configuration preferably satisfies the condition expressed by the following Inequality (13):

$$50.0 < vdL1A2 < 65.0 \qquad (13)$$

where vdL1A2 is an Abbe number of the lens L1A2 in response to a d-line.

The condition expressed by this Inequality (13) defines an Abbe number of the lens L1A2 in response to a d-line.

If vdL1A2 were equal to or less than the lower limit value set by this Inequality (13), then it would be difficult to compensate for the chromatic aberration.

If vdL1A2 were equal to or greater than the upper limit value set by this Inequality (13), then the chromatic aberration would be compensated for excessively, which is an unfavorable situation.

To enhance the advantage described above, at least one of the conditions expressed by the following Inequalities (13a) and (13b) is preferably satisfied:

$$52.0 < vdL1A2 \qquad (13a)$$

$$vdL1A2 < 62.0 \qquad (13b).$$

To further enhance the advantage described above, at least one of the conditions expressed by the following Inequalities (13c) and (13d) is more preferably satisfied:

$$55.0 < vdL1A2 \qquad (13c)$$

$$vdL1A2 < 60.0 \qquad (13d).$$

Also, an imaging optical system having the basic configuration preferably satisfies the condition expressed by the following Inequality (14):

$$0.01 < DG3/LL < 0.10 \qquad (14)$$

where DG3 is a distance on the optical axis from a surface located closest to the object in the third lens group G3 to a surface located closest to the image in the third lens group G3, and LL is a total optical length of the imaging optical system in the infinity in-focus state. Note that the units of these parameters should be the same (e.g., the units of DG3 and LL are both millimeters).

The condition expressed by this Inequality (14) defines a preferred ratio of a distance on the optical axis from a surface located closest to the object in the third lens group G3 to a surface located closest to the image in the third lens group G3 to a total optical length of the imaging optical system in the infinity in-focus state.

If DG3/LL were equal to or less than the lower limit value set by this Inequality (14), then the distance on the optical axis from the surface located closest to the object in the third lens group G3 to the surface located closest to the image in the third lens group G3 would be too short to manufacture the lenses easily.

If DG3/LL were equal to or greater than the upper limit value set by this Inequality (14), then the distance on the optical axis from the surface located closest to the object in the third lens group G3 to the surface located closest to the image in the third lens group G3 would be so long and the total lens length would also be so long as to make it difficult to downsize the lens group G3.

To enhance the advantage described above, at least one of the conditions expressed by the following Inequalities (14a) and (14b) is preferably satisfied:

$$0.02 < DG3/LL \tag{14a}$$

$$DG3/LL < 0.08 \tag{14b}$$

To further enhance the advantage described above, at least one of the conditions expressed by the following Inequalities (14c) and (14d) is more preferably satisfied:

$$0.03 < DG3/LL \tag{14c}$$

$$DG3/LL < 0.06 \tag{14d}$$

Also, an imaging optical system having the basic configuration preferably satisfies the condition expressed by the following Inequality (15):

$$0.1 < DG2\_S/LL < 1.0 \tag{15}$$

where DG2_S is a distance on the optical axis from a surface located closest to the object in the second lens group G2 to the image plane S, and LL is a total optical length of the imaging optical system in the infinity in-focus state. Note that the units of these parameters should be the same (e.g., the units of DG2_S and LL are both millimeters).

The condition expressed by this Inequality (15) defines a preferred ratio of a distance on the optical axis from a surface located closest to the object in the second lens group G2 to the image plane S to a total optical length of the imaging optical system in the infinity in-focus state.

If DG2_S/LL were equal to or less than the lower limit value set by this Inequality (15), then the back focus would be too short to avoid causing interference between the lens and the image capturing plane, which is an unfavorable situation.

If DG2_S/LL were equal to or greater than the upper limit value set by this Inequality (15), then lenses that form the second lens group G2 as the focus group would have too large a lens diameter.

To enhance the advantage described above, at least one of the conditions expressed by the following Inequalities (15a) and (15b) is preferably satisfied:

$$0.2 < DG2\_S/LL \tag{15a}$$

$$DG2\_S/LL < 0.7 \tag{15b}$$

To further enhance the advantage described above, at least one of the conditions expressed by the following Inequalities (15c) and (15d) is more preferably satisfied:

$$0.3 < DG2\_S/LL \tag{15c}$$

$$DG2\_S/LL < 0.4 \tag{15d}$$

Also, an imaging optical system having the basic configuration preferably satisfies the condition expressed by the following Inequality (16):

$$0.1 < DG1A1\_A2/D < 1.0 \tag{16}$$

where DG1A1_A2 is a distance on the optical axis from an image-side surface of the lens L1A1 to an object-side surface of the lens L1A2 (i.e., the air gap on the optical axis between the first lens L1 and the second lens L2), and D is a distance on the optical axis from a surface, located closest to the object, in the first lens group G1 to an image-side surface of a lens located fourth closest to the object in the first lens group G1 (i.e., the distance on the optical axis from the object-side surface of the first lens L1 to the image-side surface of the fourth lens L4). Note that the units of these parameters should be the same (e.g., the units of DG1A1_A2 and D are both millimeters).

The condition expressed by this Inequality (16) is a preferred ratio of a distance on the optical axis from an image-side surface of the lens L1A1 to an object-side surface of the lens L1A2 to a distance on the optical axis from a surface, located closest to the object, in the first lens group G1 to an image-side surface of a lens located fourth closest to the object in the first lens group G1.

If DG1A1_A2/D were equal to or less than the lower limit value set by this Inequality (16), then the interval between the first lens L1 and the second lens L2 would be so narrow as to allow the lenses to interfere with each other easily. This would make it difficult to leave a space needed to align their centers with each other, thus increasing the chances of causing dispersion between products due to, for example, manufacturing error, which is an unfavorable situation.

If DG1A1_A2/D were equal to or greater than the upper limit value set by this Inequality (16), then the interval between the first lens L1 and the second lens L2 would be so wide as to cause an increase in the total lens length and make it difficult to downsize the first lens group G1.

To enhance the advantage described above, at least one of the conditions expressed by the following Inequalities (16a) and (16b) is preferably satisfied:

$$0.12 < DG1A1\_A2/D \tag{16a}$$

$$DG1A1\_A2/D < 0.8 \tag{16b}$$

To further enhance the advantage described above, at least one of the conditions expressed by the following Inequalities (16c) and (16d) is more preferably satisfied:

$$0.15 < DG1A1\_A2/D \tag{16c}$$

$$DG1A1\_A2/D < 0.5 \tag{16d}$$

Figure 5:
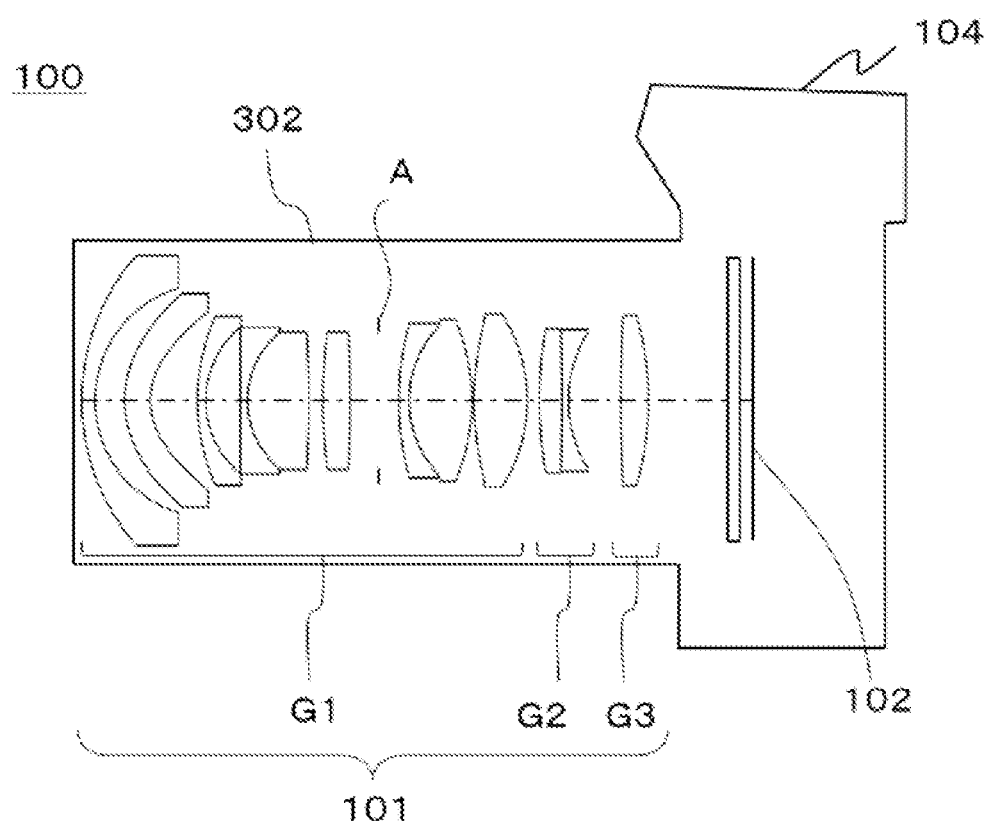
FIG. 5 illustrates a schematic configuration for a digital camera according to the first embodiment.

Schematic Configuration for Image Capture Device to which First Embodiment is Applied FIG. 5 illustrates a schematic configuration for an image capture device, to which the imaging optical system according to the first embodiment is applied. Optionally, the imaging optical system according to the second, third, or fourth embodiment is also applicable to the image capture device.

The image capture device 100 includes a housing 104, an image sensor 102, and the imaging optical system 101 according to the first embodiment. Specifically, the image capture device 100 may be implemented as a digital camera, for example.

The housing 104 includes a lens barrel 302. The lens barrel 302 holds the respective lens groups and the aperture stop A that form the imaging optical system 101.

The image sensor 102 is disposed at the image plane S of the imaging optical system 101 according to the first embodiment.

The image capture device 100 transforms an optical image of an object into an electrical image signal and displays and/or stores the image signal thus transformed. The image capture device 100 may include, for example, at least one of a monitor on which the image signal is displayed or a memory that stores the image signal.

The imaging optical system 101 forms an optical image of the object. The image sensor 102 transforms the optical image, formed by the imaging optical system 101, into an electrical image signal.

The imaging optical system 101 is configured such that the first lens group and the third lens group do not move along the optical axis and the second lens group moves along the optical axis. Specifically, to allow the second lens group G2 to move while the imaging optical system 101 is focusing, an actuator and a lens frame, which are included in the housing 104, are attached or coupled to the second lens group G2.

This provides an image capture device 100 with the ability to compensate for various types of aberrations sufficiently.

In the example described above, the imaging optical system 101 according to the first embodiment is applied to a digital camera. However, this is only an example and should not be construed as limiting. Alternatively, the imaging optical system is also applicable to a surveillance camera, a smartphone, or any of various other types of image capture devices.

Schematic Configuration for Camera System to which First Embodiment is Applied

Figure 6:
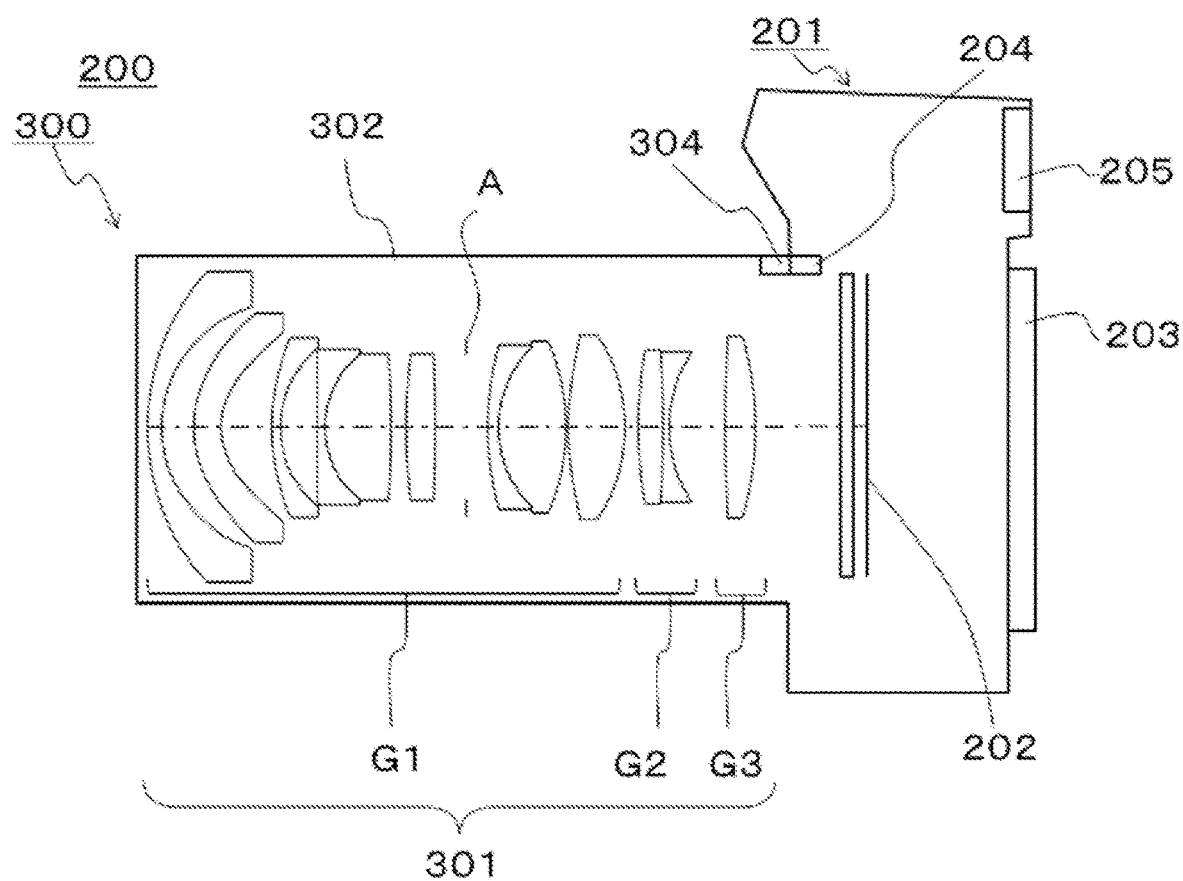
FIG. 6 illustrates a schematic configuration for a lens interchangeable digital camera system according to the first embodiment.

FIG. 6 illustrates a schematic configuration for a camera system, to which the imaging optical system according to the first embodiment is applied. Alternatively, the imaging optical system according to the second, third, or fourth embodiment is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the imaging optical system 301 of the interchangeable lens unit 300 and transforms the optical image into an electrical image signal. The monitor 203 displays the image signal transformed by the image sensor 202. The memory stores the image signal.

The imaging optical system 301 of the interchangeable lens unit 300 is the imaging optical system according to the first embodiment. The interchangeable lens unit 300 makes the imaging optical system 301 form an optical image of the object on the image sensor 202.

The interchangeable lens unit 300 includes not only the imaging optical system 301 but also a lens barrel 302 and a lens mount 304. The lens barrel 302 holds the respective lens groups and aperture stop A of the imaging optical system 301. The lens mount 304 is configured to be connected removably to the camera mount 204 of the camera body 201.

In this manner, the camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 also serve as interfaces that allow themselves to exchange signals with each other.

The imaging optical system 301 includes the respective lens groups held by the lens barrel 302. The camera body 201 includes a cover glass CG. The imaging optical system 301 includes the first lens group G1, the second lens group G2, the aperture stop A, and the third lens group G3. The imaging optical system 301 is configured such that the first lens group G1 and the third lens group G3 do not move along the optical axis and the second lens group G2 moves along the optical axis. Specifically, to allow the second lens group G2 to move while the imaging optical system 301 is focusing, an actuator and a lens frame, which are controlled by the controller in the interchangeable lens unit 300, are arranged.

Other Embodiments

The first, second, third, and fourth embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

In the first to fourth embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, refractive-diffractive hybrid lenses that deflect the incoming light ray through a combination of diffraction and refraction, or refractive index distributed lenses that deflect the incoming light ray in accordance with the distribution of refractive indices in the medium, or a combination of two or more types of these lenses. Among other things, a diffraction structure is preferably formed at the interface between two media with mutually different refractive indices in the refractive-diffractive hybrid lenses, because the diffraction efficiency would depend on the wavelength much less heavily in that case. This provides a camera system in which various types of aberrations have been compensated for sufficiently.

Examples of Numerical Values

Next, exemplary sets of specific numerical values that were actually adopted in the imaging optical systems with the configurations according to the first, second, third, and fourth embodiments will be described. Note that in the tables showing these exemplary sets of numerical values, the length is expressed in millimeters (mm), the angle of view is expressed in degrees)(°, r indicates the radius of curvature, d indicates the surface interval, nd indicates a refractive index in response to a d-line, ud (also denoted as "vd") indicates an Abbe number in response to a d-line, and a surface with an asterisk (*) is an aspheric surface. The aspheric shape is defined by the following Equation (1):

$$Z = \frac{h^2/r}{1 + \sqrt{1 - (1+\kappa)(h/r)^2}} + \sum A_n h^n$$

where Z is the distance from a point on an aspheric surface, located at a height h as measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 1B, 2B, 3B, and 4B are longitudinal aberration diagrams showing what state the imaging optical systems according to the first, second, third, and fourth examples of numerical values assume.

In each longitudinal aberration diagram, portion (a) shows the longitudinal aberrations at the infinity focus point, and portion (b) shows the longitudinal aberrations at the close-object focus point. Each of portions (a) and (b) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the imaging optical system corresponding to the first embodiment shown in FIG. 1A. Specifically, as the first example of numerical values for the imaging optical system, surface data is shown in Table 1A, aspheric surface data is shown in Table 1B, various types of data in the infinity in-focus state and close-object in-focus state are shown in Table 1C, data about single lenses is shown in Table 1D, data about lens groups is shown in Table 1E, and data about zoom powers of lens groups is shown in Table 1F.

TABLE 1A (Surface data)

| Surface No. | r | d | nd | vd |
|---|---|---|---|---|
| object surface | ∞ | Variable | | |
| 1 | 21.52410 | 1.30000 | 1.80420 | 46.5 |
| 2 | 11.49510 | 2.88980 | | |
| 3* | 10.18310 | 2.50000 | 1.53380 | 55.6 |
| 4* | 6.66670 | 4.61720 | | |
| 5 | 20.35660 | 0.80000 | 1.49700 | 81.6 |
| 6 | 9.32960 | 3.37550 | | |
| 7 | ∞ | 0.70000 | 1.59349 | 67.0 |
| 8 | 8.61960 | 0.01000 | 1.56732 | 42.8 |
| 9 | 8.61960 | 6.00000 | 1.59270 | 35.4 |
| 10 | −96.21750 | 1.34820 | | |
| 11 | 52.54740 | 2.65930 | 1.75211 | 25.0 |
| 12 | −144.26600 | 2.80000 | | |
| 13 (aperture) | ∞ | 1.97430 | | |
| 14 | 27.94310 | 1.00000 | 2.00100 | 29.1 |
| 15 | 10.53080 | 0.01000 | 1.56732 | 42.8 |
| 16 | 10.53080 | 6.11210 | 1.49700 | 81.6 |
| 17 | −20.10960 | 0.20000 | | |
| 18* | 26.30440 | 5.22090 | 1.58575 | 59.5 |
| 19* | −15.68690 | Variable | | |
| 20 | 41.50130 | 2.21190 | 1.94595 | 18.0 |
| 21 | −187.39040 | 0.01000 | 1.56732 | 42.8 |
| 22 | −187.39040 | 0.60000 | 1.84666 | 23.8 |
| 23 | 12.64740 | Variable | | |
| 24 | 157.21840 | 2.72520 | 1.62299 | 58.1 |
| 25 | −29.57090 | 10.43000 | | |
| 26 | ∞ | 4.20000 | 1.51680 | 64.2 |
| 27 | ∞ | 1.00000 | | |
| Image plane | ∞ | | | |

TABLE 1B (Aspheric surface data)

3rd surface

K = −4.13601E−01, A4 = −4.83155E−05, A6 = 9.17529E−08,
A8 = −1.33747E−08, A10 = 1.42533E−10, A12 = −5.26229E−13

4th surface

K = −7.48255E−01, A4 = −2.83442E−05, A6 = 9.67121E−07,
A8 = −8.90069E−08, A10 = 1.25287E−09, A12 = −6.87122E−12

18th surface

K = 0.00000E+00, A4 = −4.21347E−05, A6 = 1.05188E−08,
A8 = −1.99866E−09, A10 = −8.71399E−12, A12 = 9.90029E−14

19th surface

K = 0.00000E+00, A4 = 2.64024E−05, A6 = −4.74134E−07,
A8 = −1.82935E−10, A10 = −5.27974E−12, A12 = −8.61303E−14

TABLE 1C (Various types of data in infinity in-focus state and close-object in-focus state)

| | Infinity | Close-object |
|---|---|---|
| Focal length | 9.3466 | 9.2278 |
| F number | 1.76816 | 1.77089 |
| Angle of view | 49.8179 | 49.8620 |
| Image height | 10.0000 | 10.0000 |
| Total lens length | 70.9975 | 70.9922 |
| d0 | ∞ | 129.0009 |
| d19 | 1.2010 | 1.6129 |
| d23 | 5.1035 | 4.6917 |
| Entrance pupil position | 12.9734 | 12.9734 |
| Exit pupil position | −49.3881 | −48.2726 |
| Anterior principal point | 20.5511 | 20.4144 |
| Posterior principal point | 61.6509 | 61.1570 |

TABLE 1D (Data about single lenses)

| Lens | Start surface | Focal length |
|---|---|---|
| 1 | 1 | −32.5585 |
| 2 | 3 | −48.0580 |
| 3 | 5 | −35.5096 |
| 4 | 7 | −14.5235 |
| 5 | 9 | 13.6376 |
| 6 | 11 | 51.5117 |
| 7 | 14 | −17.3822 |
| 8 | 16 | 14.8927 |
| 9 | 18 | 17.5837 |
| 10 | 20 | 36.0876 |
| 11 | 22 | −13.9743 |
| 12 | 24 | 40.1764 |

TABLE 1E (Data about lens groups)

| Group | Start surface | Focal length | Lens configuration length | Anterior principal point | Posterior principal point |
|---|---|---|---|---|---|
| 1 | 1 | 6.72504 | 43.51730 | 18.59635 | 53.39115 |
| 2 | 20 | −24.16495 | 2.82190 | 2.36005 | 3.63480 |
| 3 | 24 | 40.17638 | 17.35520 | 1.42125 | 3.88889 |

TABLE 1F (Zoom powers of lens groups)

| Group | Start surface | Infinity | Close-object |
|---|---|---|---|
| 1 | 1 | 0.00000 | −0.04774 |
| 2 | 20 | 2.17172 | 2.15413 |
| 3 | 24 | 0.63996 | 0.64010 |

Second Example of Numerical Values

Following is a second exemplary set of numerical values for the imaging optical system corresponding to the second embodiment shown in FIG. 2A. Specifically, as the second example of numerical values for the imaging optical system, surface data is shown in Table 2A, aspheric surface data is shown in Table 2B, various types of data in the infinity in-focus state and close-object in-focus state are shown in Table 2C, data about single lenses is shown in Table 2D, data about lens groups is shown in Table 2E, and data about zoom powers of lens groups is shown in Table 2F.

TABLE 2A (Surface data)

| Surface No. | r | d | nd | vd |
|---|---|---|---|---|
| object surface | ∞ | Variable | | |
| 1 | 20.26490 | 1.30000 | 1.80420 | 46.5 |
| 2 | 11.14650 | 3.49600 | | |
| 3* | 10.32020 | 2.60000 | 1.53380 | 55.6 |
| 4* | 6.66670 | 3.94670 | | |
| 5 | 16.29720 | 0.80000 | 1.59283 | 68.6 |
| 6 | 9.82920 | 3.34380 | | |
| 7 | ∞ | 0.70000 | 1.59349 | 67.0 |
| 8 | 9.09440 | 0.01000 | 1.56732 | 42.8 |
| 9 | 9.09440 | 6.00000 | 1.59605 | 30.4 |
| 10 | −69.98070 | 0.97710 | | |
| 11 | 34.56000 | 3.50000 | 1.75211 | 25.0 |
| 12 | 92.70240 | 2.40000 | | |
| 13 (aperture) | ∞ | 1.50000 | | |
| 14 | 37.07980 | 1.00000 | 2.00100 | 29.1 |
| 15 | 11.07800 | 0.01000 | 1.56732 | 42.8 |
| 16 | 11.07800 | 6.35180 | 1.55032 | 75.5 |
| 17 | −17.71270 | 0.20000 | | |
| 18* | 27.23670 | 6.61100 | 1.55332 | 71.7 |
| 19* | −15.07250 | Variable | | |
| 20 | 64.59400 | 2.53230 | 1.94595 | 18.0 |
| 21 | −29.26310 | 0.01000 | 1.56732 | 42.8 |
| 22 | −29.26310 | 0.60000 | 1.84666 | 23.8 |
| 23 | 13.46920 | Variable | | |
| 24 | 41.76420 | 2.37190 | 1.84810 | 47.1 |
| 25 | −171.18090 | 10.43000 | | |
| 26 | ∞ | 4.20000 | 1.51680 | 64.2 |
| 27 | ∞ | 1.00000 | | |
| Image plane | ∞ | | | |

TABLE 2B (Aspheric surface data)

$3^{rd}$ surface

K = −6.39282E−01, A4 = −6.33076E−05, A6 = 6.46097E−07,
A8 = −1.37477E−08, A10 = 1.58888E−10, A12 = −5.96355E−13
$4^{th}$ surface K = −7.16748E−01, A4 = −9.64329E−05, A6 = 7.99780E−07,
A8 = −6.15563E−08, A10 = 9.76937E−10, A12 = −6.64285E−12

TABLE 2B-continued (Aspheric surface data)

$18^{th}$ surface

K = 0.00000E+00, A4 = −5.72968E−05, A6 = 2.40616E−07,
A8 = −1.28042E−08, A10 = 1.77443E−10, A12 = −1.16431E−12
$19^{th}$ surface K = 0.00000E+00, A4 = 1.13409E−05, A6 = −1.79265E−09,
A8 = −1.08680E−08, A10 = 1.43512E−10, A12 = −8.96872E−13

TABLE 2C (Various types of data in infinity in-focus state and close-object in-focus state)

| | Infinity | Close-object |
|---|---|---|
| Focal length | 10.1013 | 9.9451 |
| F number | 1.76831 | 1.77096 |
| Angle of view | 47.5937 | 47.6586 |
| Image height | 10.0000 | 10.0000 |
| Total lens length | 72.3039 | 72.3025 |
| d0 | ∞ | 127.7000 |
| d19 | 1.1964 | 1.6543 |
| d23 | 5.2129 | 4.7550 |
| Entrance pupil position | 13.3007 | 13.3007 |
| Exit pupil position | −47.3561 | −46.1700 |
| Anterior principal point | 21.2475 | 21.0702 |
| Posterior principal point | 62.2026 | 61.6450 |

TABLE 2D (Data about single lenses)

| Lens | Start surface | Focal length |
|---|---|---|
| 1 | 1 | −32.8939 |
| 2 | 3 | −46.8923 |
| 3 | 5 | −43.7926 |
| 4 | 7 | −15.3235 |
| 5 | 9 | 13.8968 |
| 6 | 11 | 71.4185 |
| 7 | 14 | −16.0915 |
| 8 | 16 | 13.4367 |
| 9 | 18 | 18.5695 |
| 10 | 20 | 21.5731 |
| 11 | 22 | −10.8245 |
| 12 | 24 | 39.7897 |

TABLE 2E (Data about lens groups)

| Group | Start surface | Focal length | Lens configuration length | Anterior principal point | Posterior principal point |
|---|---|---|---|---|---|
| 1 | 1 | 7.17626 | 44.74640 | 19.25453 | 54.00238 |
| 2 | 20 | −23.08986 | 3.14230 | 2.26682 | 3.72120 |
| 3 | 24 | 39.78967 | 17.00190 | 0.25301 | 2.76590 |

TABLE 2F (Zoom powers of lens groups)

| Group | Start surface | Infinity | Close-object |
|---|---|---|---|
| 1 | 1 | 0.00000 | −0.05134 |
| 2 | 20 | 2.28142 | 2.26143 |
| 3 | 24 | 0.61699 | 0.61702 |

Third Example of Numerical Values

Following is a third exemplary set of numerical values for the imaging optical system corresponding to the third embodiment shown in FIG. 3A. Specifically, as the third example of numerical values for the imaging optical system, surface data is shown in Table 3A, aspheric surface data is shown in Table 3B, various types of data in the infinity in-focus state and close-object in-focus state are shown in Table 3C, data about single lenses is shown in Table 3D, data about lens groups is shown in Table 3E, and data about zoom powers of lens groups is shown in Table 3F.

TABLE 3A (Surface data)

| Surface No. | r | d | nd | vd |
|---|---|---|---|---|
| object surface | ∞ | Variable | | |
| 1 | 22.90590 | 1.20000 | 1.95375 | 32.3 |
| 2 | 10.54100 | 2.96720 | | |
| 3* | 12.49070 | 2.50000 | 1.51602 | 56.5 |
| 4* | 7.28590 | 11.90120 | | |
| 5 | −14.87290 | 0.80000 | 1.49700 | 81.6 |
| 6 | 73.91550 | 0.01000 | 1.56732 | 42.8 |
| 7 | 73.91550 | 2.34500 | 2.00100 | 29.1 |
| 8 | −18.53010 | 2.27660 | | |
| 9 | −12.01440 | 1.00000 | 1.49700 | 81.6 |
| 10 | −17.34100 | 1.00000 | | |
| 11 (aperture) | ∞ | 4.32870 | | |
| 12 | 15.28340 | 4.08300 | 1.53775 | 74.7 |
| 13 | −42.62420 | 0.51720 | | |
| 14 | ∞ | 0.80000 | 1.95375 | 32.3 |
| 15 | 13.23620 | 0.01000 | 1.56732 | 42.8 |
| 16 | 13.23620 | 3.67650 | 1.49700 | 81.6 |
| 17 | −24.73100 | 0.93490 | | |
| 18* | 106.13890 | 4.04380 | 1.51602 | 56.5 |
| 19* | −19.80650 | Variable | | |
| 20* | −11.11910 | 2.26810 | 1.64190 | 22.5 |
| 21* | −21.69420 | Variable | | |
| 22 | 30.83590 | 3.67810 | 1.48749 | 70.4 |
| 23 | −42.59340 | 10.80220 | | |
| 24 | ∞ | 4.20000 | 1.51680 | 64.2 |
| 25 | ∞ | 1.00000 | | |
| Image plane | ∞ | | | |

TABLE 3B (Aspheric surface data)

3$^{rd}$ surface

K = −2.70512E−01, A4 = 8.23955E−05, A6 = −1.41872E−06, A8 = 1.25669E−08, A10 = −6.48285E−11

4$^{th}$ surface

K = −9.98814E−01, A4 = 1.52609E−04, A6 = −2.63666E−06, A8 = 7.17647E−09, A10 = −1.52969E−10

18$^{th}$ surface

K = 0.00000E+00, A4 = −2.28763E−04, A6 = −4.54975E−06, A8 = 1.65888E−08, A10 = −4.77889E−10

TABLE 3B-continued (Aspheric surface data)

19$^{th}$ surface

K = 0.00000E+00, A4 = −8.38116E−05, A6 = −5.31109E−06, A8 = 5.08478E−08, A10 = −3.19373E−10

20$^{th}$ surface

K = 0.00000E+00, A4 = 1.02640E−03, A6 = −1.11239E−05, A8 = 8.24437E−08, A10 = −1.66997E−10

21$^{st}$ surface

K = 0.00000E+00, A4 = 7.73439E−04, A6 = −4.36622E−06, A8 = −1.82425E−08, A10 = 2.65100E−10

TABLE 3C (Various types of data in infinity in-focus state and close-object in-focus state)

| | Infinity | Close-object |
|---|---|---|
| Focal length | 9.3150 | 9.2532 |
| F number | 1.76801 | 1.77534 |
| Angle of view | 49.7611 | 49.7613 |
| Image height | 10.0000 | 10.0000 |
| Total lens length | 71.0341 | 71.0109 |
| d0 | ∞ | 128.9978 |
| d19 | 1.2000 | 1.9460 |
| d21 | 3.4597 | 2.7137 |
| Entrance pupil position | 10.9738 | 10.9738 |
| Exit pupil position | −83.0404 | −79.2775 |
| Anterior principal point | 19.2443 | 19.1387 |
| Posterior principal point | 61.7191 | 61.1412 |

TABLE 3D (Data about single lenses)

| Lens | Start surface | Focal length |
|---|---|---|
| 1 | 1 | −21.4923 |
| 2 | 3 | −40.5069 |
| 3 | 5 | −24.8384 |
| 4 | 7 | 14.9913 |
| 5 | 9 | −83.9308 |
| 6 | 12 | 21.4488 |
| 7 | 14 | −13.8781 |
| 8 | 16 | 17.9239 |
| 9 | 18 | 32.7044 |
| 10 | 20 | −38.7877 |
| 11 | 22 | 37.3038 |

TABLE 3E (Data about lens groups)

| Group | Start surface | Focal length | Lens configuration length | Anterior principal point | Posterior principal point |
|---|---|---|---|---|---|
| 1 | 1 | 8.50508 | 44.39410 | 17.93650 | 54.12445 |
| 2 | 20 | −38.78773 | 2.26810 | −1.58538 | −0.82510 |
| 3 | 22 | 37.30377 | 18.68030 | 1.05571 | 3.65086 |

TABLE 3F (Zoom powers of lens groups)

| Group | Start surface | Infinity | Close-object |
|---|---|---|---|
| 1 | 1 | 0.00000 | −0.06144 |
| 2 | 20 | 1.92333 | 1.90226 |
| 3 | 22 | 0.56944 | 0.57007 |

Fourth Example of Numerical Values

Following is a fourth exemplary set of numerical values for the imaging optical system corresponding to the fourth embodiment shown in FIG. 4A. Specifically, as the fourth example of numerical values for the imaging optical system, surface data is shown in Table 4A, aspheric surface data is shown in Table 4B, various types of data in the infinity in-focus state and close-object in-focus state are shown in Table 4C, data about single lenses is shown in Table 4D, data about lens groups is shown in Table 4E, and data about zoom powers of lens groups is shown in Table 4F.

TABLE 4A (Surface data)

| Surface No. | r | d | nd | vd |
|---|---|---|---|---|
| object surface | ∞ | Variable | | |
| 1 | 25.16230 | 1.50000 | 1.87071 | 40.7 |
| 2 | 10.68800 | 2.83920 | | |
| 3* | 21.74520 | 2.30000 | 1.51602 | 56.5 |
| 4* | 11.34520 | 5.52880 | | |
| 5 | 146.90700 | 1.00000 | 1.49700 | 81.6 |
| 6 | 12.04680 | 0.01000 | 1.56732 | 42.8 |
| 7 | 12.04680 | 4.00000 | 1.84666 | 23.8 |
| 8 | 14.36270 | 6.81020 | | |
| 9 | 39.18250 | 2.69240 | 1.90366 | 31.3 |
| 10 | −39.18250 | 4.86680 | | |
| 11 (aperture) | ∞ | 1.70000 | | |
| 12 | 33.31680 | 0.80000 | 2.00100 | 29.1 |
| 13 | 10.64360 | 0.01000 | 1.56732 | 42.8 |
| 14 | 10.64360 | 4.43550 | 1.55032 | 75.5 |
| 15 | −37.83430 | 2.57030 | | |
| 16* | 21.17880 | 4.33020 | 1.61881 | 63.9 |
| 17* | −18.56740 | Variable | | |
| 18 | 34.06230 | 0.80000 | 1.91082 | 35.2 |
| 19 | 12.85710 | Variable | | |
| 20 | 168.50900 | 2.45310 | 1.59283 | 68.6 |
| 21 | −28.25740 | 10.80000 | | |
| 22 | ∞ | 4.20000 | 1.51680 | 64.2 |
| 23 | ∞ | 1.00000 | | |
| Image plane | ∞ | | | |

TABLE 4B (Aspheric surface data)

3$^{rd}$ surface

K = 0.00000E+00, A4 = 3.34480E−04, A6 = −2.40675E−06,
A8 = 1.77608E−08, A10 = −7.00153E−11, A12 = 0.00000E+00,
A14 = 0.00000E+00

4$^{th}$ surface

K = 0.00000E+00, A4 = 3.78767E−04, A6 = −3.23045E−06,
A8 = 2.23521E−08, A10 = −3.15635E−10, A12 = 0.00000E+00,
A14 = 0.00000E+00

16$^{th}$ surface

K = 0.00000E+00, A4 = −3.85694E−05, A6 = 3.29081E−07,
A8 = −8.57234E−09, A10 = 5.88995E−11, A12 = 1.09634E−13,
A14 = 1.89390E−21

TABLE 4B-continued (Aspheric surface data)

17$^{th}$ surface

K = 0.00000E+00, A4 = 3.48156E−05, A6 = −9.85426E−08,
A8 = −5.80609E−09, A10 = 3.59244E−11, A12 = 2.12753E−13,
A14 = −1.80773E−21

TABLE 4C (Various types of data in infinity in-focus state and close-object in-focus state)

| | Infinity | Close-object |
|---|---|---|
| Focal length | 9.3145 | 9.1995 |
| F number | 1.76860 | 1.77124 |
| Angle of view | 49.9380 | 50.0104 |
| Image height | 10.0000 | 10.0000 |
| Total lens length | 70.9977 | 70.9961 |
| d0 | ∞ | 129.0001 |
| d17 | 1.2015 | 1.5681 |
| d19 | 5.1519 | 4.7853 |
| Entrance pupil position | 11.9476 | 11.9476 |
| Exit pupil position | −46.9921 | −46.1107 |
| Anterior principal point | 19.4157 | 19.2870 |
| Posterior principal point | 61.6832 | 61.1881 |

TABLE 4D (Data about single lenses)

| Lens | Start surface | Focal length |
|---|---|---|
| 1 | 1 | −22.4207 |
| 2 | 3 | −49.7123 |
| 3 | 5 | −26.4696 |
| 4 | 7 | 49.2455 |
| 5 | 9 | 22.0394 |
| 6 | 12 | −15.9051 |
| 7 | 14 | 15.6010 |
| 8 | 16 | 16.6831 |
| 9 | 18 | −23.0899 |
| 10 | 20 | 41.0107 |

TABLE 4E (Data about lens groups)

| Group | Start surface | Focal length | Lens configuration length | Anterior principal point | Posterior principal point |
|---|---|---|---|---|---|
| 1 | 1 | 6.41458 | 45.39340 | 17.25418 | 53.78799 |
| 2 | 18 | 23.08988 | 0.80000 | 0.68483 | 1.05849 |
| 3 | 20 | 41.01069 | 17.45310 | 1.32507 | 3.66191 |

TABLE 4F (Zoom powers of lens groups)

| Group | Start surface | Infinity | Close-object |
|---|---|---|---|
| 1 | 1 | 0.00000 | −0.04587 |
| 2 | 18 | 2.27105 | 2.25501 |
| 3 | 20 | 0.63939 | 0.63943 |

Values Corresponding to Inequalities

Values, corresponding to the Inequalities (1) to (16), of the respective examples of numerical values are shown in the following Table 5:

TABLE 5

|  | 1st example of numerical values | 2nd example of numerical values | 3rd example of numerical values | 4th example of numerical values |
| --- | --- | --- | --- | --- |
| Inequality (1) | 1.92 | 2.00 | 2.08 | 1.53 |
| Inequality (2) | 3.13 | 3.25 | 3.13 | 2.30 |
| Inequality (3) | 1.19 | 1.24 | 1.25 | 0.92 |
| Inequality (4) | 0.58 | 0.62 | 0.43 | 0.54 |
| Inequality (5) | 1.56 | 1.56 | 1.56 | 1.56 |
| Inequality (6) | L3: 81.6 L4: 67.0 | L3: 68.6 L3: 67.0 | L3: 81.6 | L3: 81.6 |
| Inequality (7) | 1.59 | 1.59 | 1.50 | 1.50 |
| Inequality (8) | 1.95 | 1.95 | — | — |
| Inequality (9) | 0.59 | 0.60 | 0.63 | 0.56 |
| Inequality (10) | L8: 81.6 | L8: 75.5 L9: 71.7 | L6: 74.7 L8: 81.6 | L7: 75.5 L8: 63.9 |
| Inequality (11) | 0.14 | 0.15 | 0.21 | 0.13 |
| Inequality (12) | 1.53 | 1.53 | 1.52 | 1.52 |
| Inequality (13) | 55.6 | 55.6 | 56.5 | 56.5 |
| Inequality (14) | 0.038 | 0.033 | 0.052 | 0.035 |
| Inequality (15) | 0.37 | 0.36 | 0.36 | 0.34 |
| Inequality (16) | 0.18 | 0.22 | 0.14 | 0.17 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The imaging optical system according to the present disclosure is applicable to various types of cameras including digital still cameras, lens interchangeable digital cameras, digital camcorders, cameras for cellphones and smartphones, and cameras for personal digital assistants (PDAs), surveillance cameras for surveillance systems, Web cameras, and onboard cameras. Among other things, the present disclosure is particularly effectively applicable as an imaging optical system for digital still camera systems, digital camcorder systems, and other camera systems that require high image quality.

The invention claimed is:
1. An imaging optical system consisting of:
a first lens group having positive power;
a second lens group having negative power; and
a third lens group having positive power,
the first lens group, the second lens group, and the third lens group being arranged in this order such that the first lens group is located closer to an object than any other lens group of the imaging optical system is,
the first lens group and the third lens group being fixed with respect to an image plane, with the second lens group moving along an optical axis, while the imaging optical system is focusing to make a transition from an infinity in-focus state toward a close-object in-focus state,
the first lens group consisting of:
a sub-lens group G1A;
an aperture stop; and
a sub-lens group G1B,
the sub-lens group G1A, the aperture stop, and the sub-lens group G1B being arranged in this order such that the sub-lens group G1A is located closer to the object than the aperture stop or the sub-lens group G1B is,
the sub-lens group G1A including, as a plurality of lenses:
a lens L1A1 having negative power and disposed closest to the object in the plurality of lenses;
a lens L1A2 having negative power and disposed second closest to the object in the plurality of lenses; and
a lens L1A3 having negative power and disposed third closest to the object in the plurality of lenses.
2. The imaging optical system of claim 1, wherein
the sub-lens group G1A further includes a lens L1A4 having negative power and disposed fourth closest to the object in the plurality of lenses.
3. The imaging optical system of claim 1, wherein
the imaging optical system satisfies the following Inequality (1):

$$0.9 < DL1A2/DL1A1 \tag{1}$$

where DL1A1 is a thickness of the lens L1A1 on the optical axis, and
DL1A2 is a thickness of the lens L1A2 on the optical axis.
4. The imaging optical system of claim 1, wherein
the imaging optical system satisfies the following Inequality (2):

$$1.0 < DL1A2/DL1A3 \tag{2}$$

where DL1A2 is a thickness of the lens L1A2 on the optical axis, and
DL1A3 is a thickness of the lens L1A3 on the optical axis.
5. The imaging optical system of claim 1, wherein
the imaging optical system satisfies the following Inequality (3):

$$0.7 < DL1A2/(DL1A1 + DL1A3) \tag{3}$$

where DL1A1 is a thickness of the lens L1A1 on the optical axis,
DL1A2 is a thickness of the lens L1A2 on the optical axis, and
DL1A3 is a thickness of the lens L1A3 on the optical axis.

6. The imaging optical system of claim 1, wherein the imaging optical system satisfies the following Inequality (4):

$$0.3 < f/D < 1.0 \qquad (4)$$

where f is a focal length of the imaging optical system in the infinity in-focus state, and
D is a distance on the optical axis from a surface, located closest to the object, in the first lens group to an image-side surface of a lens located fourth closest to the object in the first lens group.

7. The imaging optical system of claim 1, wherein the imaging optical system satisfies the following Inequality (5):

$$0.3 < BF/Y < 2.0 \qquad (5)$$

where BF is a back focus of the imaging optical system, and
Y is an image height of the imaging optical system in the infinity in-focus state.

8. The imaging optical system of claim 1, wherein at least one negative lens belonging to the sub-lens group G1A satisfies the following Inequality (6):

$$vdL1An > 62 \qquad (6)$$

where vdL1An is an Abbe number of the at least one negative lens in the sub-lens group G1A in response to a d-line.

9. The imaging optical system of claim 1, wherein the sub-lens group G1A includes a bonded lens formed by a positive lens L1p and a negative lens L1n, and
the imaging optical system satisfies the following Inequality (7):

$$1.4 < ndL1n < 1.65 \qquad (7)$$

where ndL1n is a refractive index of the negative lens L1n in response to a d-line.

10. The imaging optical system of claim 1, wherein the second lens group includes a bonded lens formed by a positive lens L2p and a negative lens L2n, and
the imaging optical system satisfies the following Inequality (8):

$$1.85 < ndL2p \qquad (8)$$

where ndL2p is a refractive index of the positive lens L2p in response to a d-line.

11. The imaging optical system of claim 1, wherein the imaging optical system satisfies the following Inequality (9):

$$0.5 < Ls/LL \qquad (9)$$

where Ls is a distance on the optical axis from the aperture stop to the image plane, and
LL is a total optical length of the imaging optical system in the infinity in-focus state.

12. The imaging optical system of claim 1, wherein the sub-lens group G1B includes at least one positive lens and satisfies the following Inequality (10):

$$vdL1Bp > 65 \qquad (10)$$

where vdL1Bp is an Abbe number of the at least one positive lens in the sub-lens group G1B in response to a d-line.

13. The imaging optical system of claim 1, wherein the second lens group consists of at most two lenses.

14. The imaging optical system of claim 1, wherein the imaging optical system satisfies the following Inequality (11):

$$0.08 < |fG1/fL1A2| < 0.3 \qquad (11)$$

where fG1 is a focal length of the first lens group, and
fL1A2 is a focal length of the lens L1A2.

15. The imaging optical system of claim 1, wherein the imaging optical system satisfies the following Inequalities (12) and (13):

$$1.45 < ndL1A2 < 1.60 \qquad (12)$$

$$50.0 < vdL1A2 < 65.0 \qquad (13)$$

where ndL1A2 is a refractive index of the lens L1A2 in response to a d-line, and
vdL1A2 is an Abbe number of the lens L1A2 in response to the d-line.

16. The imaging optical system of claim 1, wherein the imaging optical system satisfies the following Inequality (14):

$$0.01 < DG3/LL < 0.10 \qquad (14)$$

where DG3 is a distance on the optical axis from a surface located closest to the object in the third lens group to a surface located closest to the image plane in the third lens group, and
LL is a total optical length of the imaging optical system in the infinity in-focus state.

17. The imaging optical system of claim 1, wherein the imaging optical system satisfies the following Inequality (15):

$$0.1 < DG2\_S/LL < 1.0 \qquad (15)$$

where DG2_S is a distance on the optical axis from a surface located closest to the object in the second lens group to the image plane, and
LL is a total optical length of the imaging optical system in the infinity in-focus state.

18. The imaging optical system of claim 1, wherein the imaging optical system satisfies the following Inequality (16):

$$0.1 < DG1A1\_A2/D < 1.0 \qquad (16)$$

where DG1A1_A2 is a distance on the optical axis from an image-side surface of the lens L1A1 to an object-side surface of the lens L1A2, and
D is a distance on the optical axis from a surface, located closest to the object, in the first lens group to an image-side surface of a lens located fourth closest to the object in the first lens group.

19. A camera system comprising:
an interchangeable lens unit including the imaging optical system of claim 1; and
a camera body including: an image sensor configured to receive an optical image formed by the imaging optical system and transform the optical image into an electrical image signal; and a camera mount, the camera body being configured to be connected removably to the interchangeable lens unit via the camera mount,
the interchangeable lens unit forming the optical image of the object on the image sensor.

20. An image capture device configured to transform an optical image of an object into an electrical image signal and display and/or store the electrical image signal transformed, the image capture device comprising:
the imaging optical system of claim 1 configured to form the optical image of the object; and
an image sensor configured to transform the optical image formed by the imaging optical system into the electrical image signal.

* * * * *